United States Patent
Montemont

(10) Patent No.: US 12,085,683 B2
(45) Date of Patent: Sep. 10, 2024

(54) METHOD FOR FORMING A GAMMA IMAGE WITH SUB-PIXEL RESOLUTION, TAKING INTO ACCOUNT A SPATIAL NON-UNIFORMITY IN SENSITIVITY

(71) Applicant: Commissariat à l'énergie atomique et aux énergies alternatives, Paris (FR)

(72) Inventor: Guillaume Montemont, Grenoble (FR)

(73) Assignee: Commissariat à l'énergie atomique et aux énergies alternatives, Paris (FR)

(*) Notice: Subject to any disclaimer, the term of this patent is extended or adjusted under 35 U.S.C. 154(b) by 0 days.

(21) Appl. No.: 17/864,548

(22) Filed: Jul. 14, 2022

(65) Prior Publication Data
US 2023/0016263 A1    Jan. 19, 2023

(30) Foreign Application Priority Data
Jul. 14, 2021  (FR) ...................... 21 07628

(51) Int. Cl.
*G01T 1/29* (2006.01)
(52) U.S. Cl.
CPC ................ *G01T 1/2935* (2013.01)
(58) Field of Classification Search
CPC ................................................ G01T 1/2935
See application file for complete search history.

(56) References Cited

U.S. PATENT DOCUMENTS 9,696,440 B2 * 7/2017 Shahar ................ G01T 7/005
2011/0155918 A1 6/2011 Bouhnik et al.
2015/0260854 A1 9/2015 Lux et al.

OTHER PUBLICATIONS

Zhu et al., "Sub-Pixel Position Sensing for Pixelated, 3-D Position Sensitive, Wide Band-Gap, Semiconductor, Gamma-Ray Detectors", IEEE Transactions on Nuclear Science, vol. 58, No. 3, Jun. 2011, 10 pages.

* cited by examiner

*Primary Examiner* — David P Porta
*Assistant Examiner* — Fani Polyzos Boosalis
(74) *Attorney, Agent, or Firm* — Oblon, McClelland, Maier & Neustadt, L.L.P.

(57) ABSTRACT

A method for determining a spatial-sensitivity function of a gamma camera, the gamma camera observing a field of observation (Ω) liable to contain radiation sources, the gamma camera including a detector material; pixels, distributed over a detecting area, each pixel being configured to form a detection signal under the effect of detection of an interaction of an ionising photon in the detector material; a unit for achieving sub-pixel resolution, the unit being programmed to assign a position (x,y) to each detected interaction on the basis of detection signals formed by a plurality of pixels, the position being determined on a mesh dividing each pixel into a plurality of virtual pixels. The method includes steps allowing weights assigned to each virtual pixel to be determined, each weight corresponding to a sensitivity of each virtual pixel.

20 Claims, 11 Drawing Sheets

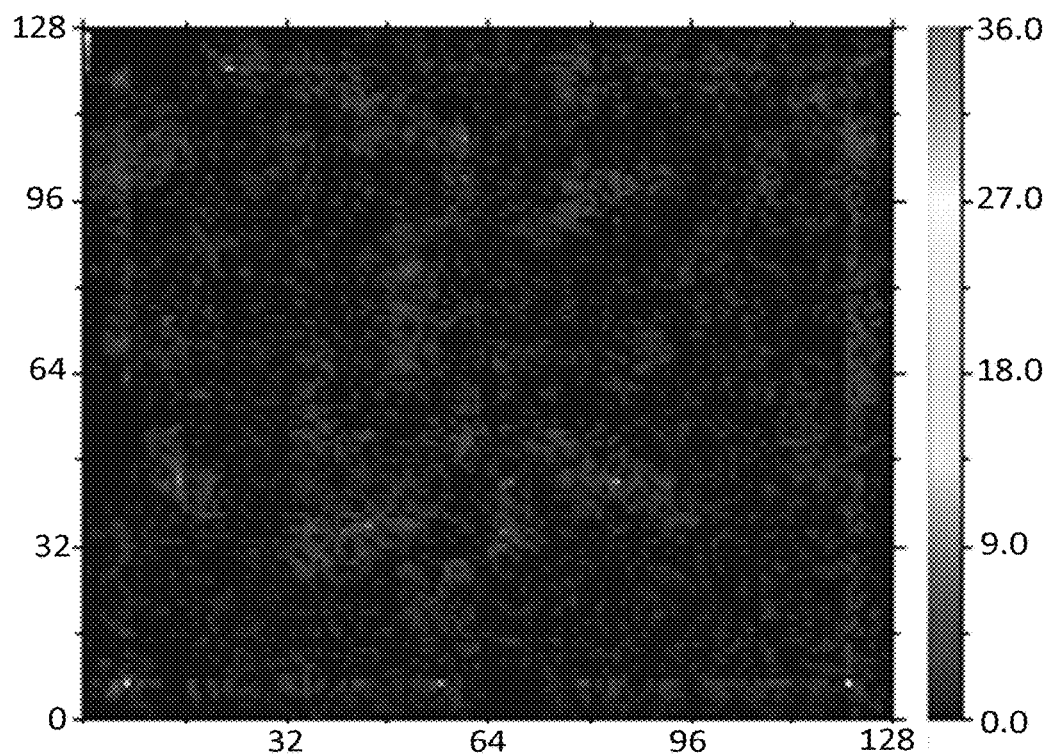
Fig. 4A
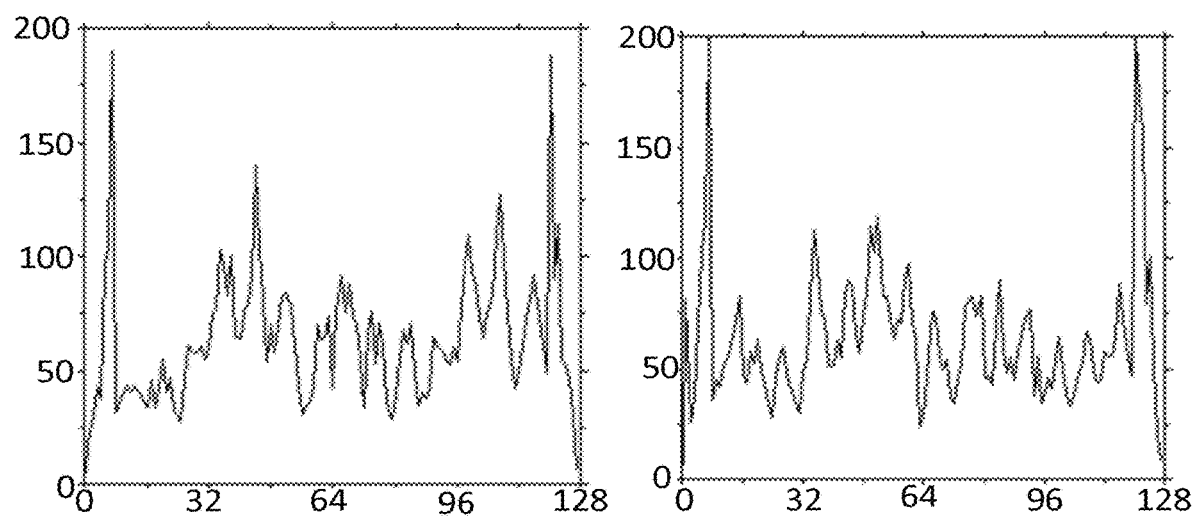
Fig. 4B
Fig. 4C

METHOD FOR FORMING A GAMMA IMAGE WITH SUB-PIXEL RESOLUTION, TAKING INTO ACCOUNT A SPATIAL NON-UNIFORMITY IN SENSITIVITY

TECHNICAL FIELD

The technical field of the invention is x-ray or gamma imaging, and more particularly reconstruction of the position of radiation sources using an image acquired by a gamma camera.

PRIOR ART

Gamma cameras are devices that allow an image to be formed, to map radiation sources in a given environment. A first application is visualization of a radiation source in an organism, for medical diagnostic purposes. Another application is location of a radiation source in an installation, and in particular in a nuclear installation.

Gamma cameras have been used in the medical field for a relatively long time. This type of device was developed for use in the nuclear industry in the 1990s, and is increasingly used in nuclear installations for the purposes of radiological characterization. The objective is to identify the main radiation sources present in an installation. Specifically, radiation sources are not uniformly distributed. They are often concentrated locally, forming "hotspots" to use the term conventionally used in the field of radioprotection. Gamma cameras are advantageous in that they allow these hotspots to be located at distance.

Certain gamma cameras employ a two-dimensional matrix array of pixels that is connected to a detector material. The detector material is generally a semiconductor material, for example CdTe or CdZnTe. Under the effect of an interaction between ionizing radiation and the detector material, one or more pixels generate an electrical pulse, the amplitude of which is correlated with the energy released by the radiation during the interaction. Each pixel is connected to an electronic circuit for processing pulses.

Each pixel is formed from one electrode, which usually acts as anode. When incident radiation interacts in the detector material, electrons are released to the detector material. These electrons are collected by an anode. The latter generates a pulse, the amplitude of which depends on the number of electrons collected by the anode, this number generally being proportional to energy lost by the ionising radiation in the detector material.

Each pixel has a side length of a few millimetres. For reasons of compactness, the matrix array of pixels generally comprises one hundred, or a few hundred, pixels per row and per column. In order to obtain a sufficient spatial resolution, each pixel may be "sub-pixelated" or used to achieve "sub-pixel resolution", i.e. each pixel may be sub-divided into virtual pixels. Methods have already been developed that allow, rather than a pixel, a virtual pixel to be associated with each interaction. Such methods exploit the fact that when an interaction occurs in the detector material, charge carriers, which migrate towards the matrix array of anodes, generate a signal that is detectable by a plurality of adjacent pixels. Thus, these methods are based on combination of signals detected by a plurality of adjacent pixels. Such a method is for example described in the publications Warburton W. K, "An approach to sub-pixel spatial resolution in room temperature X-ray detector arrays with good energy resolution" and Montemont et al. "Studying spatial resolution of CZT detectors using sub-pixel positioning for SPECT", IEEE transactions on nuclear science, Vol. 61, No 5, October 2014, or indeed in U.S. Pat. No. 9,322,937B2. Using these methods, the size of the virtual pixels may for example be decreased to 0.5 mm*0.5 mm, or 0.1 mm by 0.1 mm.

However, the inventor has observed that application of such methods causes problems with non-uniformity in the response of the gamma camera. When the pixel matrix array is irradiated by a uniform flux of photons, sub-division into virtual pixels leads to a spatially non-uniform gamma-camera response: the number of interactions associated with "central" virtual pixels, i.e. virtual pixels located at the centre of a pixel, is over-estimated, to the detriment of the number of interactions associated with "peripheral" virtual pixels, i.e. virtual pixels located on the periphery of a pixel. Such a non-uniformity may be disadvantageous when the image formed by the gamma camera is subjected to processing operations with a view to reconstructing an image of radiation sources in the field of observation. This is for example the case of gamma cameras using a coded-aperture mask collimator. Non-uniformities may generate artefacts on reconstruction of the map showing the position of the radiation sources.

There are other causes of non-uniformity in the response of a gamma camera. In nuclear installations, radiation sources that are said to be "out of field" may be located beyond or on the edge of the field of observation. Such radiation sources generate parasitic radiation that may have an impact on the image formed by the gamma camera. Gamma cameras comprise a collimator, defining the field of observation. When the collimator is a coded-aperture mask, the image formed by the gamma camera is reconstructed in order to take into account the presence of the coded-aperture mask. Radiation sources located on the edge of the field of observation may generate artefacts during the reconstruction. When the collimator is a pinhole collimator, highly radioactive sources located beyond the field of observation may produce a nonuniform fog that affects the image acquired by the gamma camera.

Another cause that affects the non-uniformity of gamma cameras is the presence of defects in the detector material, which locally modify detection sensitivity.

The invention described below addresses this problem, and allows the spatial non-uniformity of a gamma camera to be decreased.

SUMMARY OF THE INVENTION

A first subject of the invention is a method for determining a spatial-sensitivity function of a gamma camera, the gamma camera being configured to locate radiation sources in a field of observation, the field of observation being liable to contain radiation sources, the gamma camera comprising:
  a detector material;
  pixels, distributed over a detecting area of the detector material, each pixel being configured to form a detection signal under the effect of detection of an interaction of an ionising photon in the detector material;
  a unit for achieving sub-pixel resolution, said unit being programmed to assign, to each detected interaction, a position parallel to the detecting area, on the basis of detection signals formed by a plurality of pixels, the position being determined on a mesh of the detecting area that divides each pixel into a plurality of virtual pixels, the virtual pixels being distributed in rows and columns;

a memory, configured to store a quantity of interactions detected in the course of an acquisition period and respectively assigned to each virtual pixel;

the method comprising the following steps:
a) acquiring detection signals with the pixels during one acquisition period, each detection signal being associated with one detected interaction;
b) depending on the detection signals, attributing a position of each interaction detected, during the acquisition period, to one virtual pixel;
c) storing, in the memory, a number of detected interactions assigned to each virtual pixel.

The method further comprises, following step c),
d) defining groups of virtual pixels, each group containing a plurality of virtual pixels;
e) computing a value for each group, the value for each group being computed on the basis of a sum of the number of interactions positioned in each virtual pixel belonging to the group,
f) on the basis of the value computed for each group, assigning a weight to each virtual pixel, the weight assigned to each virtual pixel being representative of a detection sensitivity of said virtual pixel, all of the weights respectively assigned to each virtual pixel forming the spatial-sensitivity function of the gamma camera.

According to a first embodiment:
the virtual pixels are distributed in rows and columns over the detecting area;
each group of virtual pixels contains pixels belonging to the same row or to the same column;
step e) comprises the following sub-steps:
  e-i) forming a first vector, containing first terms, each first term being associated with one column of virtual pixels, each first term comprising a sum of the quantity of interactions positioned in each virtual pixel of the column;
  e-2) forming a second vector, containing second terms, each second term being associated with one row of virtual pixels, each second term comprising a sum of the quantity of interactions positioned in each virtual pixel of the row;
step f) comprises the following sub-steps:
  f-1) for each virtual pixel, computing a product of multiplication of a first term, associated with the column of the virtual pixel, by a second term, associated with the row of the virtual pixel;
  f-2) determining the weight assigned to the virtual pixel depending on the product computed in sub-step f-1).

Sub-step f-2) may comprise:
computing a mean value of the products respectively computed, in sub-step f-1), for a set of virtual pixels;
for each virtual pixel, normalizing the product resulting from sub-step f-1) by the mean value.

According to one variant of the first embodiment, when the pixels are of small size, it is not necessary to achieve sub-pixel resolution. In this case, the unit for achieving sub-pixel resolution is not necessary. The method then comprises the following steps:
a) acquiring detection signals with the pixels during one acquisition period, each detection signal being associated with one detected interaction;
b) depending on the detection signals, attributing a position of each interaction detected, during the acquisition period, to one pixel;
c) storing, in the memory, a number of detected interactions assigned to each virtual pixel.

The method further comprises, following step c),
d) defining groups of pixels, each group containing a plurality of pixels;
e) computing a value for each group, the value of each group being computed on the basis of a sum of the number of interactions positioned in each pixel belonging to the group,
f) on the basis of the value computed for each group, assigning a weight to each pixel, the weight assigned to each pixel being representative of a detection sensitivity of said pixel, all of the weights respectively assigned to each pixel forming the spatial-sensitivity function of the gamma camera.

According to this variant, with the pixels being distributed in rows and columns over the detecting area, each group of pixels comprises pixels belonging to the same row or to the same column. Steps e-1), e-2), f-1) and f-2) described above are implemented or performed analogously considering columns or rows of pixels.

According to one embodiment:
each pixel is divided into the same number of virtual pixels;
with each virtual pixel is associated a rank, the rank defining a position of the virtual pixel in a pixel;
each group of virtual pixels contains virtual pixels of same rank;
step e) comprises computing a mean value of the number of interactions positioned in the virtual pixels, of the same rank, of various pixels;
in step f), the weight assigned to a virtual pixel of a rank corresponds to the mean value computed in step e) for said rank.

Whatever the embodiment, the method may comprise:
g) generating a sensitivity matrix, each point of the sensitivity matrix corresponding to one virtual pixel of the gamma camera, the value of the sensitivity matrix at each point corresponding to the weight assigned to said virtual pixel.

The gamma camera may comprise a processing unit configured to process the interactions stored in the memory. The method comprises a step h) of reconstructing a spatial distribution of the radiation sources, in the field of observation, on the basis of the interactions stored in step c) and of the weights assigned to each virtual pixel in step f). The processing unit may normalize a number of interactions detected by each virtual pixel by the weight assigned to said virtual pixel.

Preferably,
each pixel is connected to a spectrometry unit, the spectrometry unit being configured to classify each detection signal into one energy band among a plurality of energy bands;
in step b), each interaction positioned in a virtual pixel is associated with one detected energy band;
step h) comprises:
  taking into account at least one isotope, the isotope emitting photons in at least one emission energy;
  reconstructing a spatial distribution of radiation sources comprising the isotope on the basis of the interactions positioned in step b).

Step h) may comprise:
taking into account a spectral response function of each pixel, the spectral response function representing a detection probability, in various energy bands, of each photon emitted by the isotope and detected in the pixel;
taking into account a spatial response function, the spatial response function representing a probability of detection, in various virtual pixels, of a photon emitted from one point in the field of observation.

According to one possibility, the camera comprises a collimator defining the field of observation, and in particular a coded-aperture mask collimator.

A second subject of the invention is a gamma camera intended to detect a presence of radiation sources in a field of observation, the gamma camera comprising:
- a detector material;
- pixels, distributed over a detecting area of the detector material, each pixel being configured to form a detection signal under the effect of detection of an interaction of an ionising photon in the detector material;
- a unit for achieving sub-pixel resolution, said unit being programmed to assign, to each detected interaction, a position parallel to the detecting area, on the basis of detection signals formed by a plurality of pixels, the position being determined on a mesh of the detecting area that divides each pixel into a plurality of virtual pixels, the mesh of the detecting area distributing the virtual pixels in rows and columns;
- a memory, configured to store a quantity of interactions detected in the course of an acquisition period and respectively assigned to each virtual pixel;
- a processing unit, configured to process the interactions stored in the memory, the processing unit being configured to implement steps d) to f) of a method according to the first subject of the invention on the basis of the detected interactions.

According to one variant of the second subject of the invention, when the pixels of the gamma camera are sufficiently small, the unit for achieving sub-pixel resolution is not necessary. The processing unit is configured to implement steps d) to f) of the variant of the first embodiment, which variant was described above with reference to the first subject of the invention.

A third subject of the invention is a method for reconstructing a spatial distribution of radiation sources in the field of observation of a gamma camera according to the second subject of the invention, the method comprising the following steps:
i) acquiring detection signals with the pixels of the gamma camera during an acquisition period, each detection signal being associated with one detected interaction;
ii) depending on the detection signals, assigning, with the unit for achieving sub-pixel resolution, a position of each interaction detected during the acquisition period, the position corresponding to one virtual pixel;
iii) storing, in the memory, a number of detected interactions assigned to each virtual pixel.

The method further comprises:
iv) taking into account weights respectively assigned to each virtual pixel, each weight being determined by implementing the steps a) to f) of the method according to the first subject of the invention, step a) being performed by exposing the gamma camera to a field of observation identical to or different from the field of observation to which the gamma camera is exposed in step i);
v) reconstructing the spatial distribution of the radiation sources, in the field of observation, on the basis of the interactions stored in step iii) and of the weights assigned to each virtual pixel in step iv).

According to one embodiment:
in step i), the field of observation is identical to the field of observation of the gamma camera in step a);

step ii) and step b) are one and the same;
step iii) and step c) are one and the same.

According to one embodiment:
in step i), the field of observation is different from the field of observation of the gamma camera in step a);
step iv) is implemented taking into account weights assigned to each virtual pixel, the weights having been established in the course of an implementation of steps a) to f), prior or subsequent to step i).

According to one variant of the third subject of the invention, when the pixels of the gamma camera are sufficiently small, the unit for achieving sub-pixel resolution is not necessary. The method implements a gamma camera without a unit for achieving sub-pixel resolution. Steps iii), iv) and v) are implemented taking into account pixels instead of virtual pixels.

The invention will be better understood on reading the text describing examples of embodiment that are presented, in the rest of the description, with reference to the figures listed below.

FIGURES

FIG. 1A schematically shows the main components of a gamma camera allowing the invention to be implemented.

FIGS. 2C and 2D illustrate the actual positions of the interactions and the interaction positions delivered by the unit for achieving sub-pixel resolution, respectively.

Figure 3A:
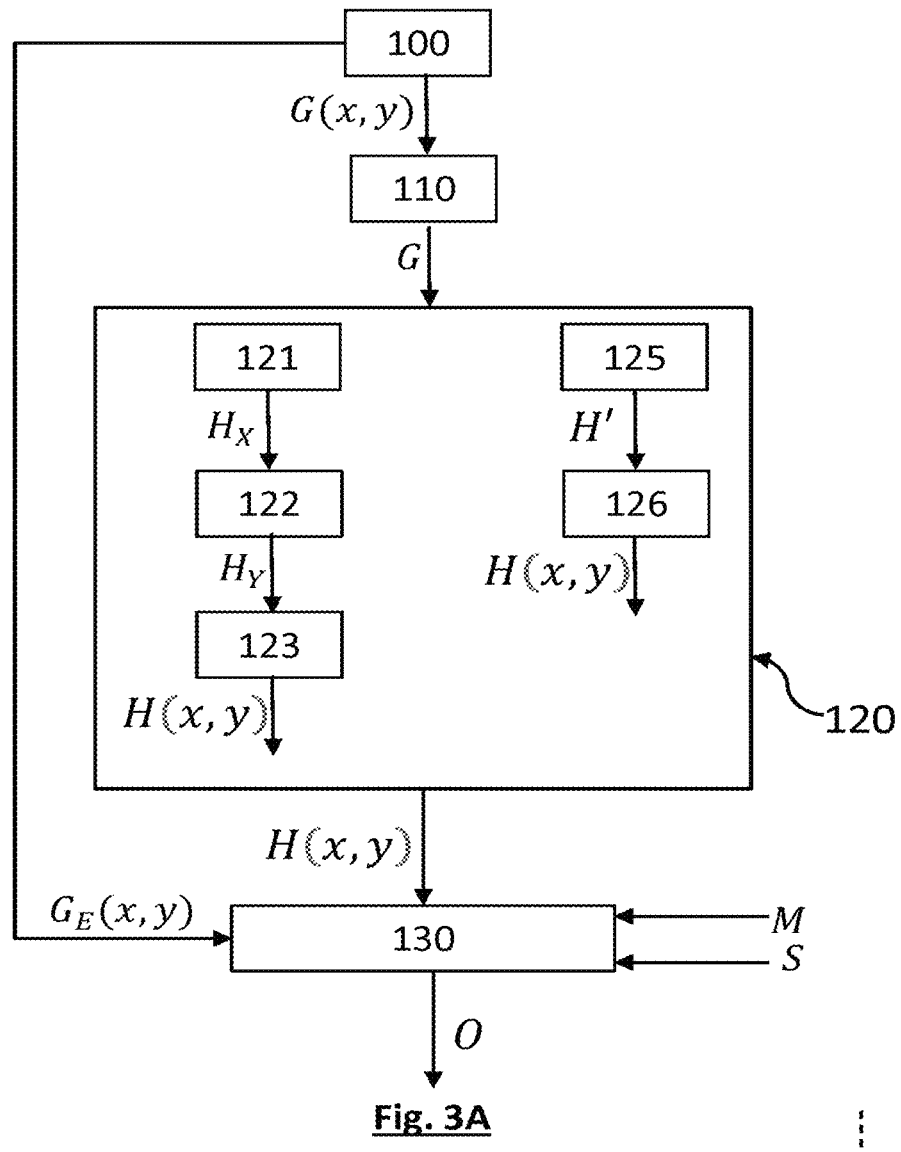

FIG. 3A schematically shows the main steps of a method for determining the spatial-sensitivity function of various virtual pixels of a gamma camera (steps 100 to 120), and the step of reconstructing an object image showing a spatial distribution of radiation sources in the field of observation (step 130).

Figure 3B:
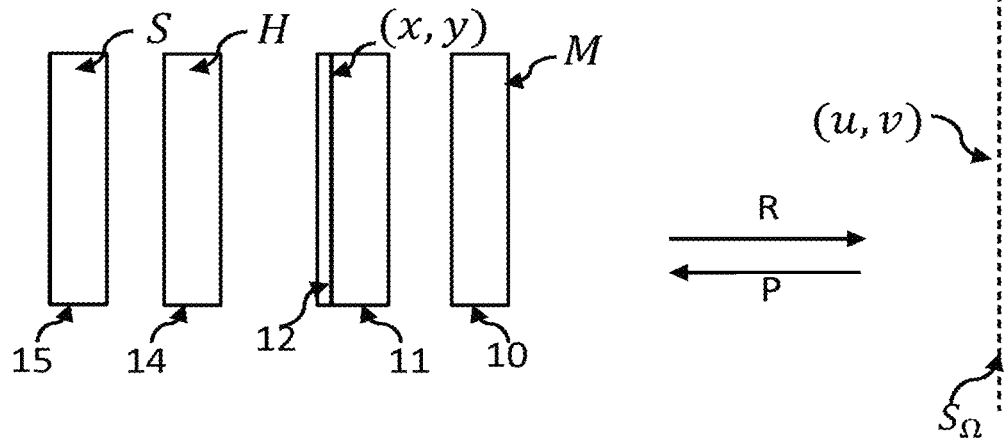

FIG. 3B illustrates components of the gamma camera described with reference to FIG. 1A, and, spatial or spectral, response functions associated with these components.

FIGS. 4A to 4D illustrate a first embodiment of the invention.

FIG. 4A shows one example of a gamma image acquired by the gamma camera described with reference to FIG. 1A.

FIGS. 4B and 4C schematically show the terms of a first vector and of a second vector allowing the spatial-sensitivity function of the gamma camera to be determined, respectively.

Figure 4D:
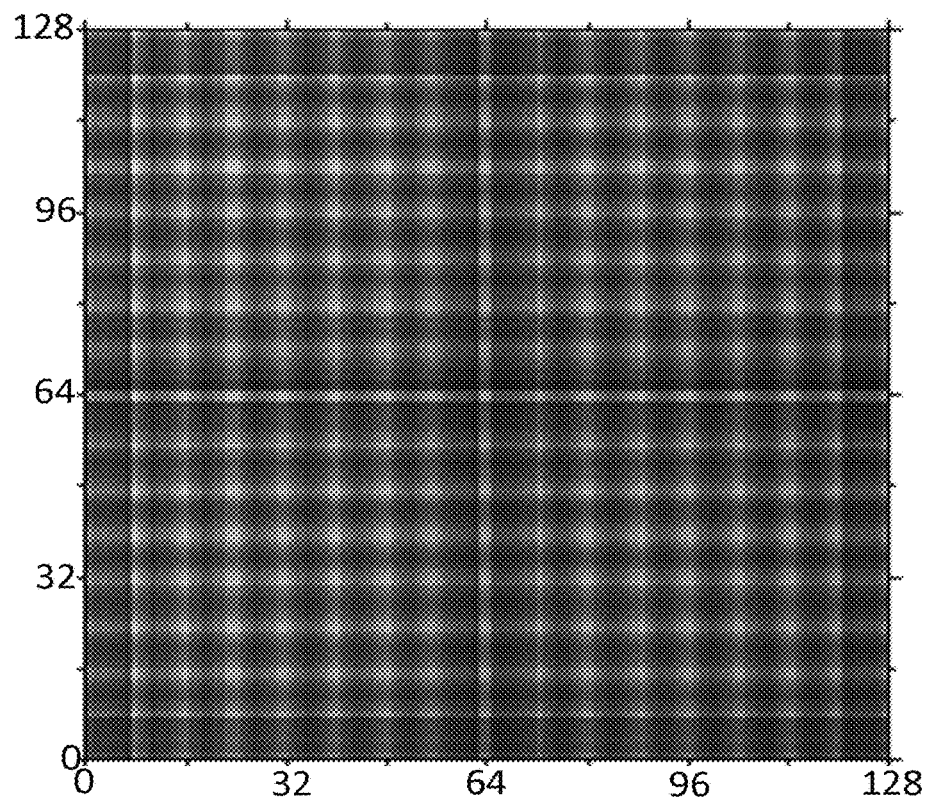

FIG. 4D is a representation, in matrix form, of a gamma-camera spatial-sensitivity function obtained according to the first embodiment.

Figure 5A:
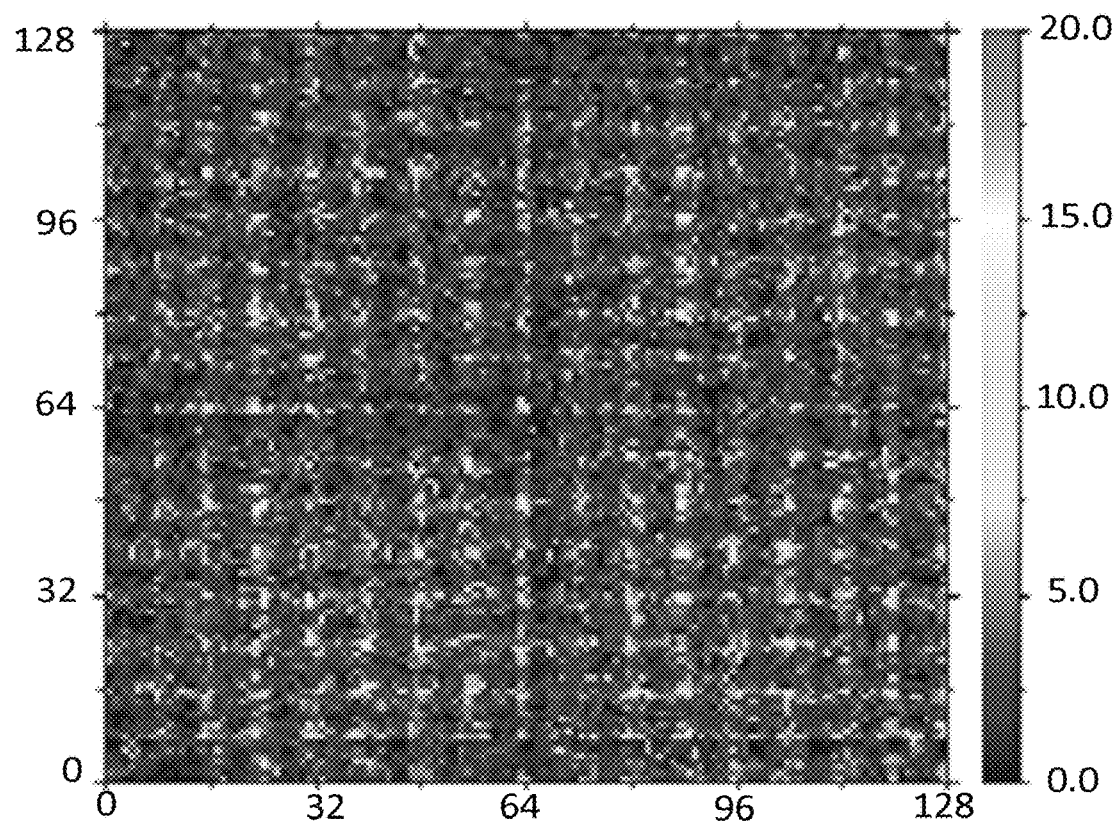
Figure 5B:
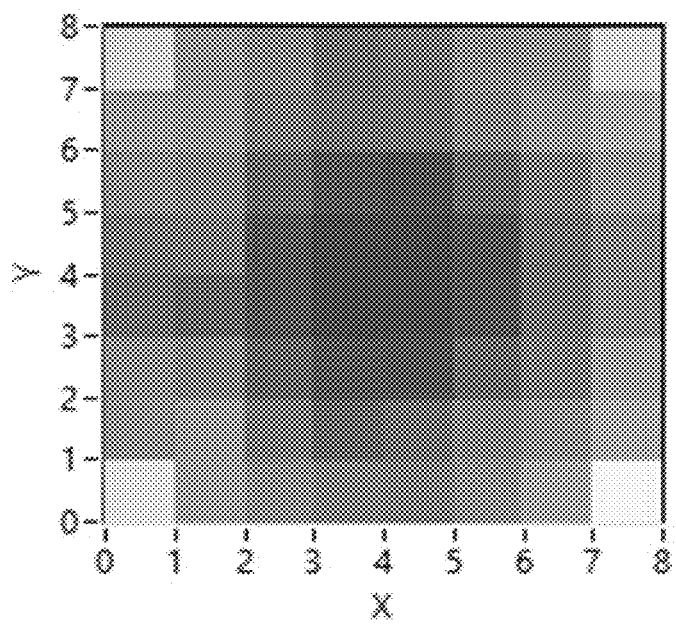
Figure 5C:
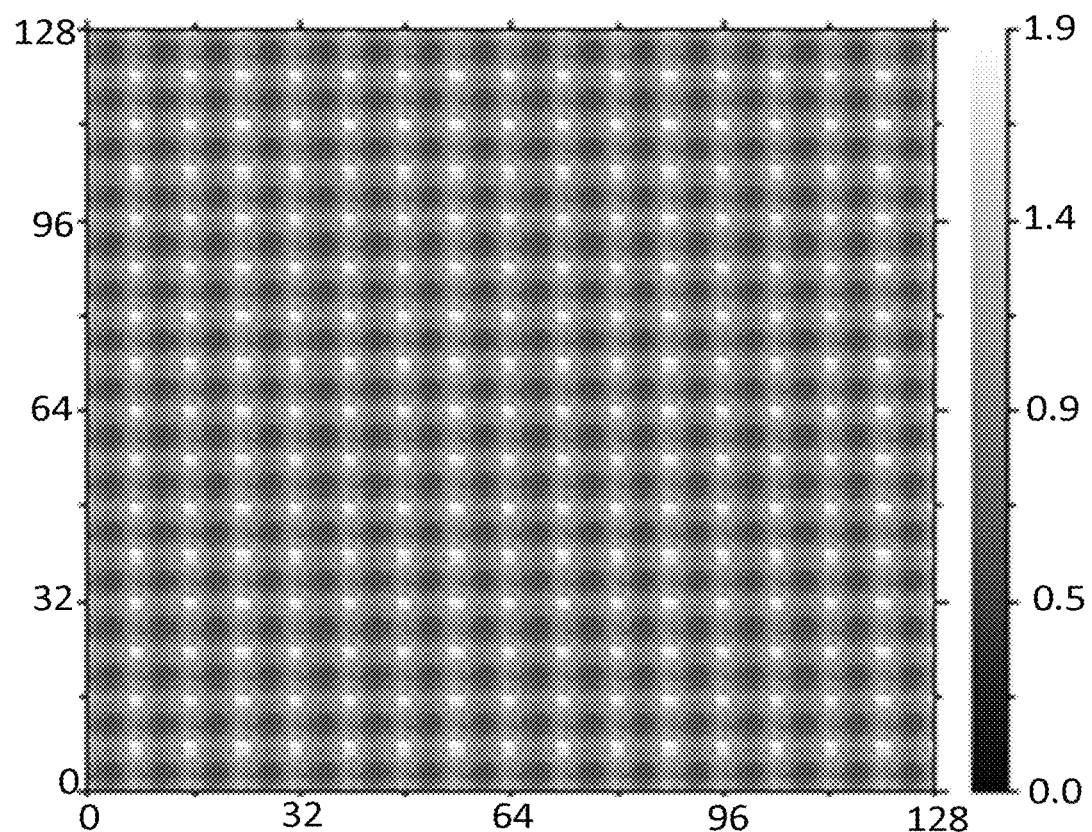

FIGS. 5A to 5C illustrate a second embodiment of the invention.

FIG. 5A shows one example of a gamma image acquired under in-the-field conditions, with a substantial contribution from scattered radiation.

FIG. 5B shows a mean image, in which the value of each point corresponds to a mean of a quantity of interactions detected by virtual pixels of the same rank.

FIG. 5C is a representation, in matrix form, of a gamma-camera spatial-sensitivity function obtained according to the second embodiment.

Figure 6:
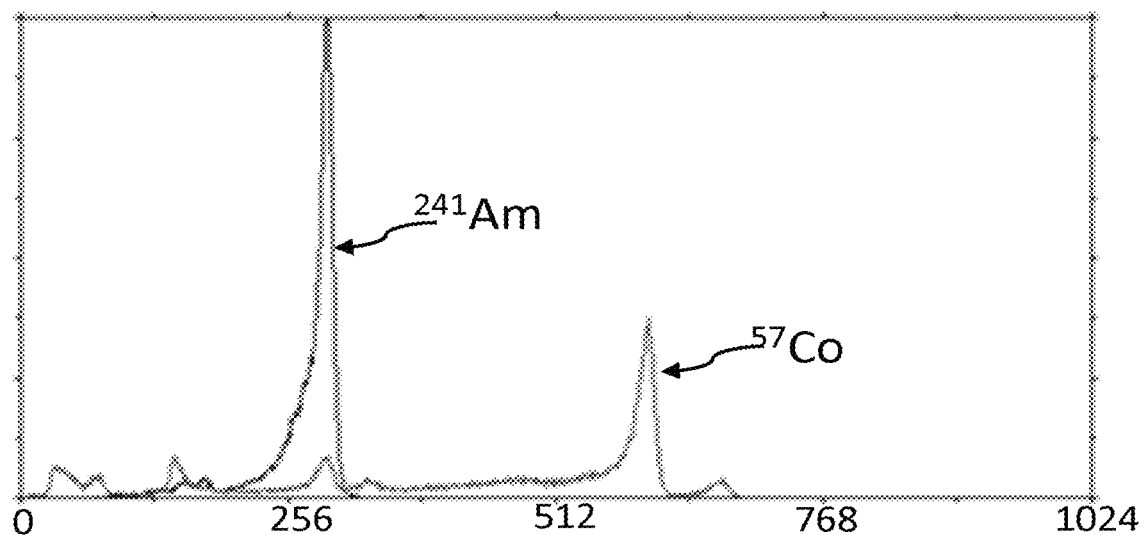

FIG. 6 shows a spectral response function of a pixel of the gamma camera, for two different isotopes. The x-axis corresponds to an energy channel and the y-axis represents a probability of detection in the energy channel.

Figure 7A:
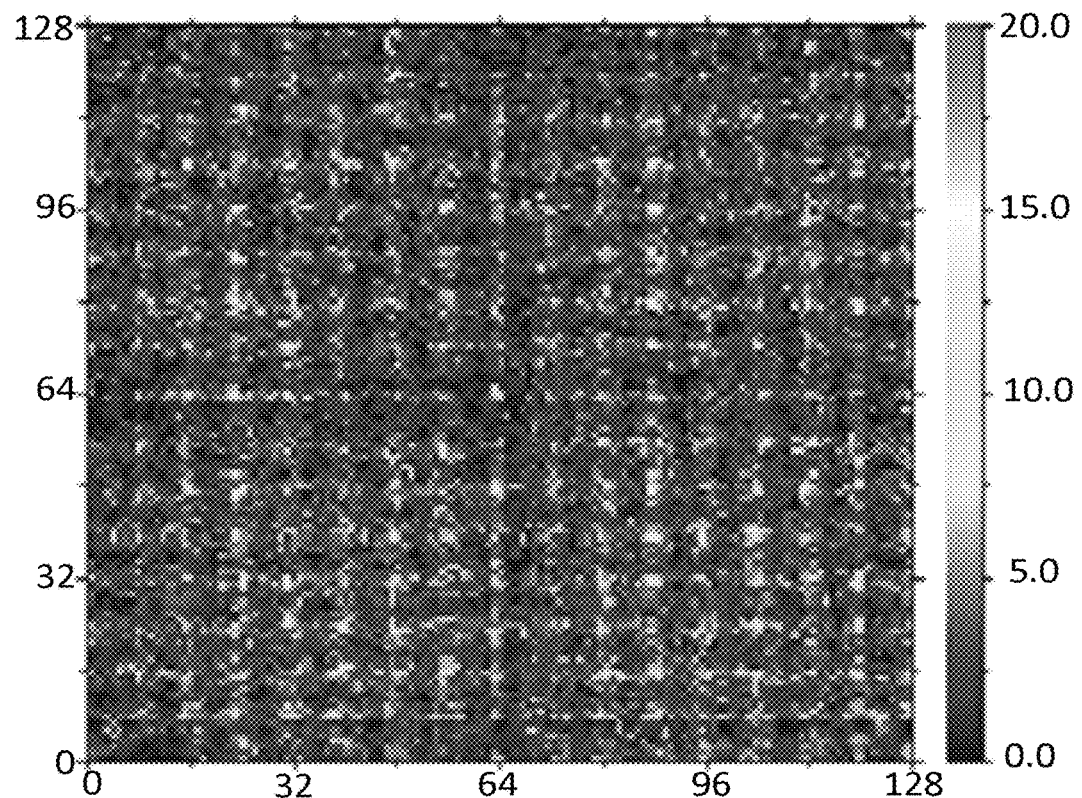
Figure 7B:
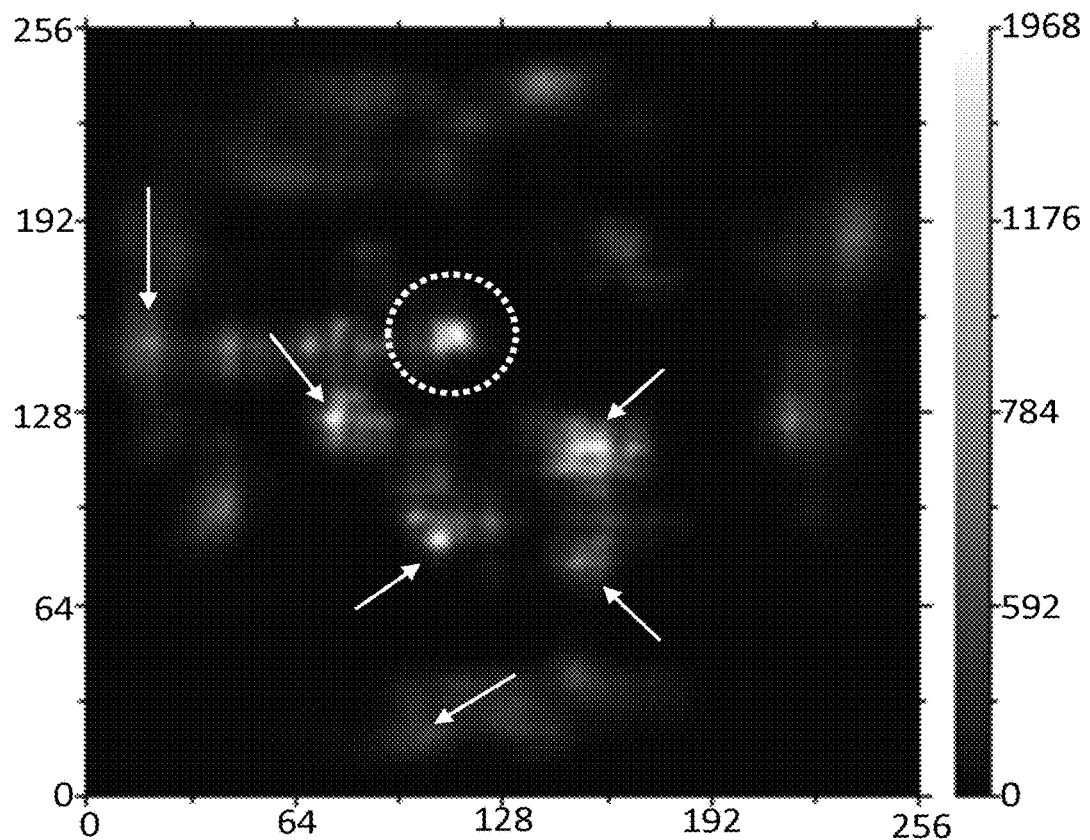

FIGS. 7A and 7B show a gamma image acquired by a gamma camera and an object image reconstructed on the basis of the gamma image, without implementation of the invention, respectively.

Figure 7C:
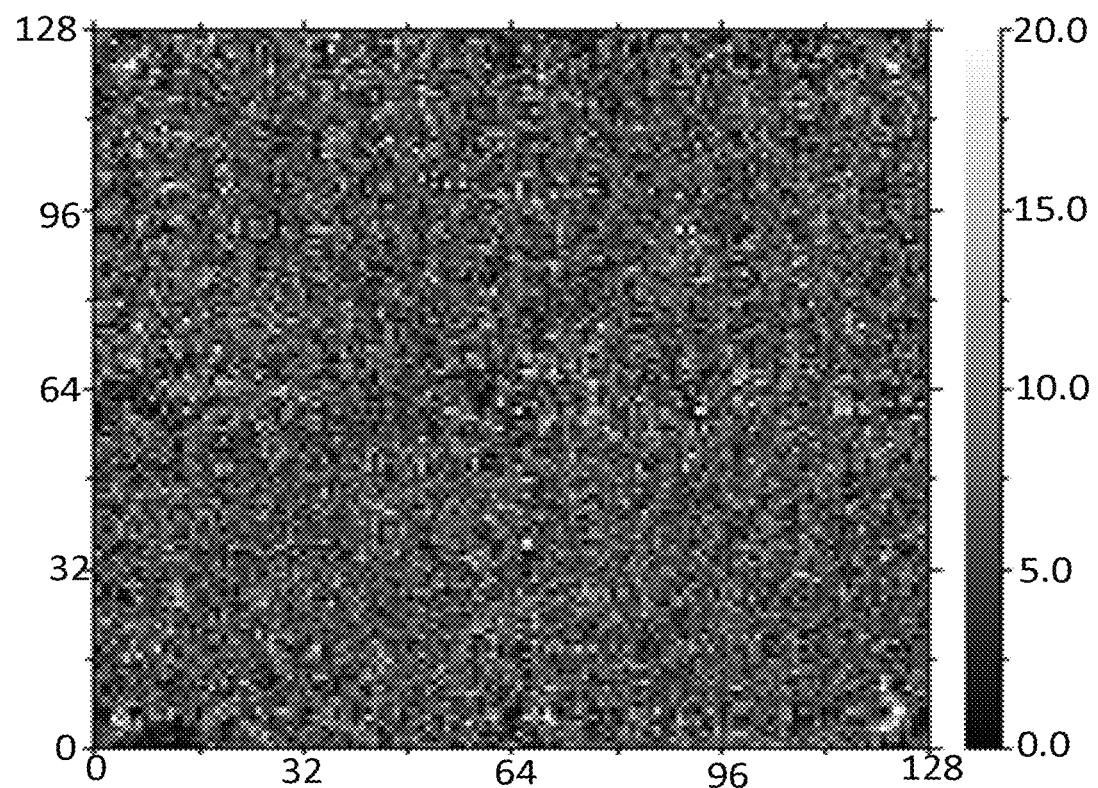

FIG. 7C shows the gamma image of FIG. 7A after application of a spatial-sensitivity function, the latter being determined according to a first embodiment of the invention.

Figure 7D:
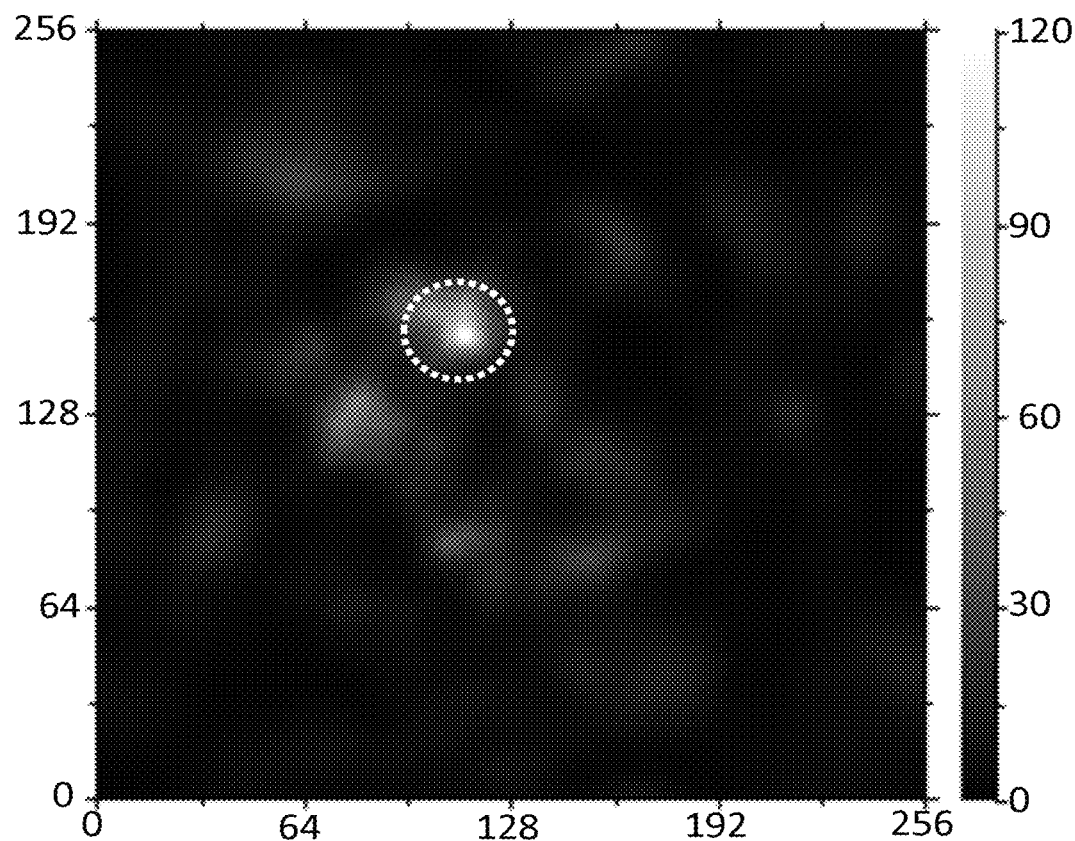

FIG. 7D respectively shows an object image reconstructed on the basis of the gamma image shown in FIG. 7C.

Figure 7E:
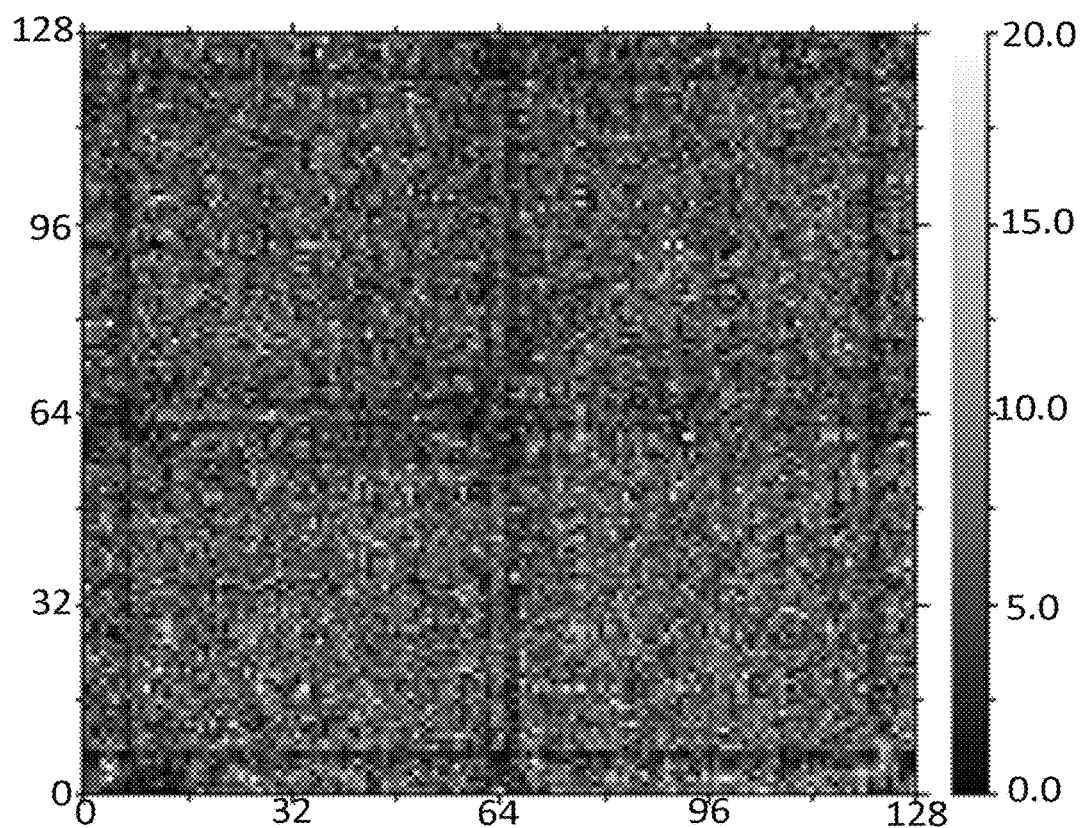

FIG. 7E shows the gamma image of FIG. 7A after application of a spatial-sensitivity function, the latter being determined according to a second embodiment of the invention.

Figure 7F:
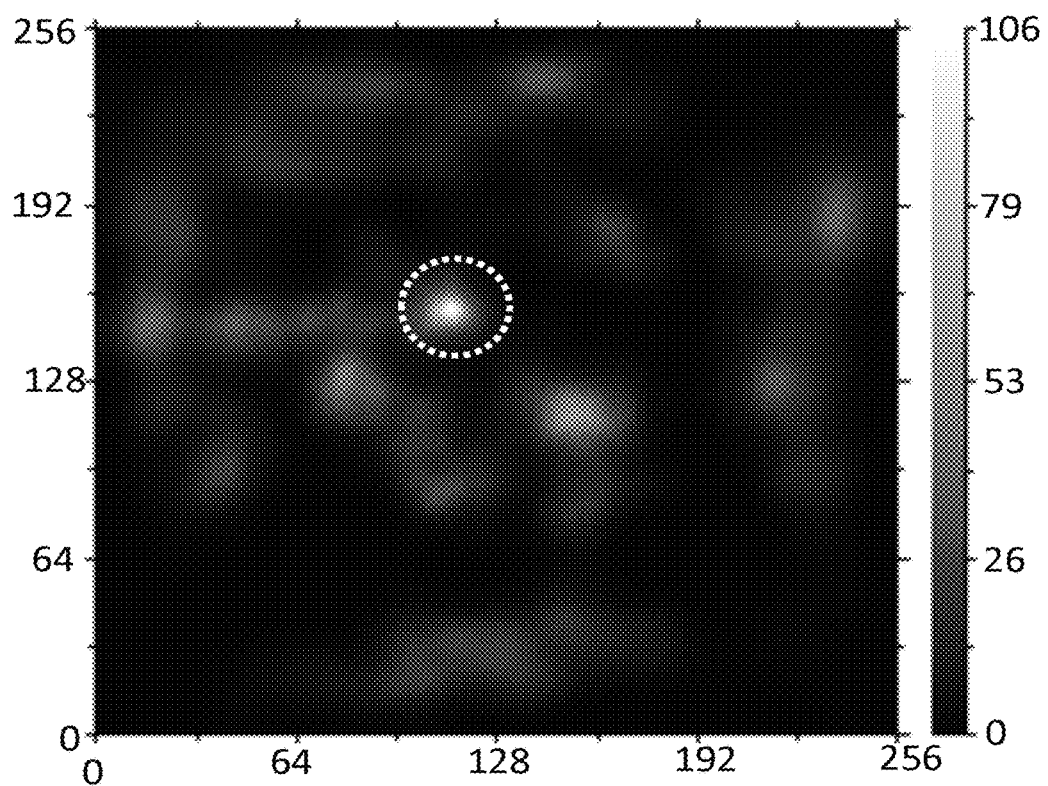

FIG. 7F respectively shows an object image reconstructed on the basis of the gamma image shown in FIG. 7E.

DESCRIPTION OF PARTICULAR EMBODIMENTS

Figure 1A:
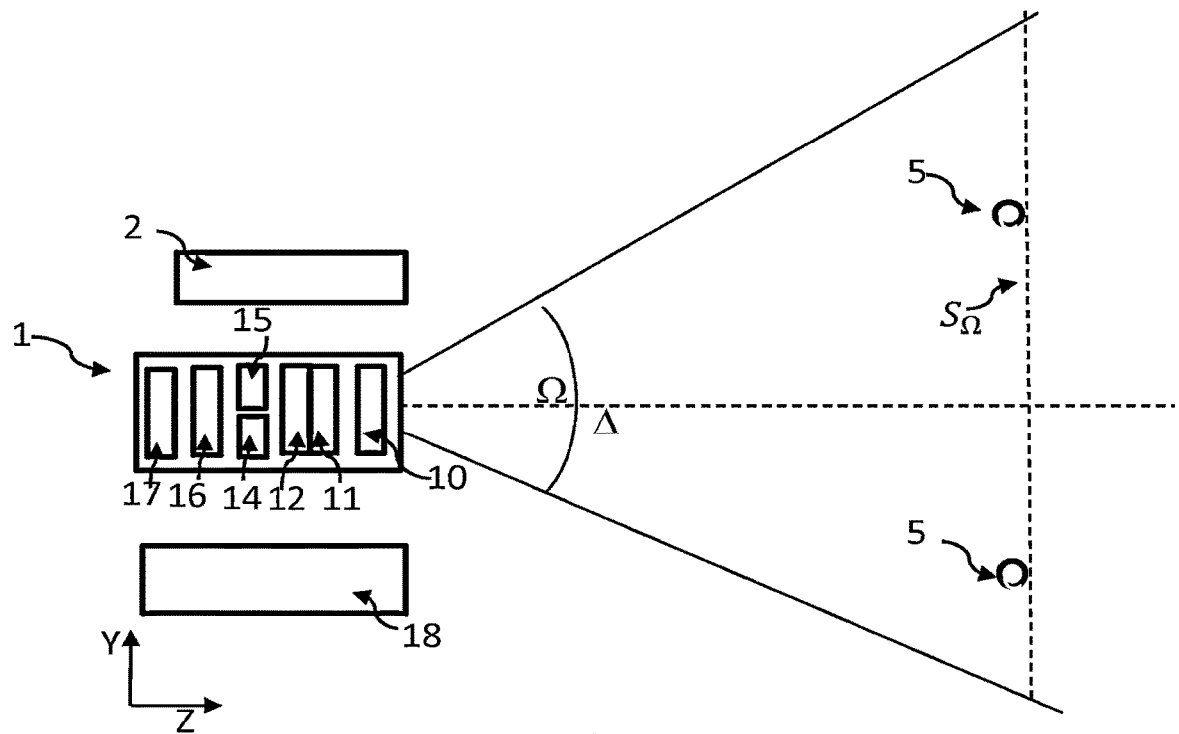
FIG. 1B shows a segmentation of pixels into virtual pixels (or sub-pixels).

FIG. 1A shows a gamma camera 1, allowing the invention to be implemented. The gamma camera 1 is configured to detect, in a field of observation $\Omega$, ionizing X-ray or gamma-ray photons, the energy of which is generally comprised between 10 keV and 10 MeV. The field of observation $\Omega$ extends about a central axis $\Delta$. The gamma camera 1 may be coupled to a visible camera, allowing a visible image of the field of observation to be formed. The term gamma camera corresponds to an imager having a field of observation and configured to form an object image O allowing radiation sources to be located in the field of observation $\Omega$.

The gamma camera 1 comprises a detector material 11, usually a semiconductor material allowing charge carriers (electrons/hole pairs) to be created during an interaction with x-rays or gamma radiation. It may for example be CdTe or CdZnTe. Generally, the detector material is prone to interact with ionising photons, in such a way as to generate charge carriers. The detector material is preferably a semiconductor material. Alternatively, it may be a scintillator material coupled to a photodetector.

Figure 1B:
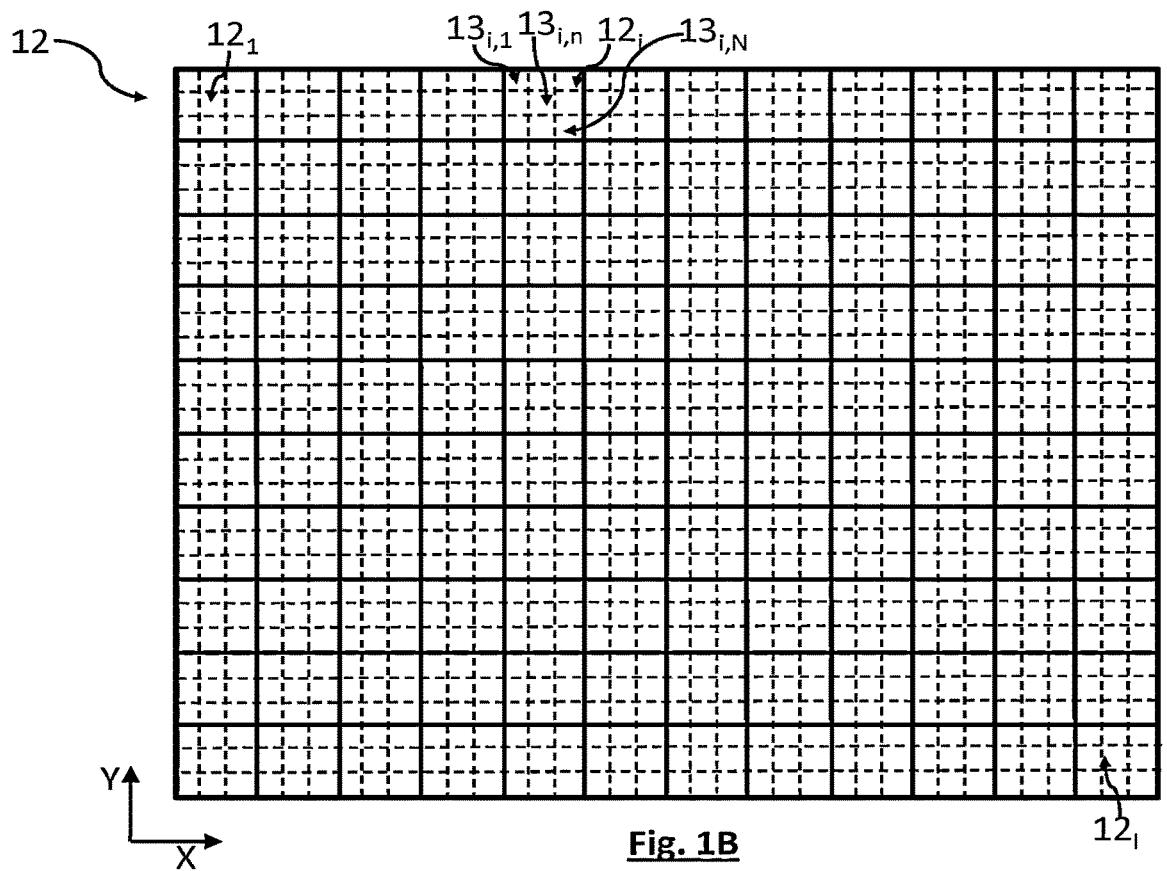

The gamma camera 1 comprises pixels $12_1 \ldots 12_i \ldots 12_I$ that are distributed over a detecting area. The pixels are shown in FIG. 1B. The index i represents a rank of each pixel $12_i$. I is the number of pixels. Generally, the pixels $12_i$ are coplanar and distributed in a two-dimensional matrix array, preferably regularly. The matrix array may for example comprise a few tens or even hundreds of pixels. $N_{xi}$ corresponds to the number of pixels along the axis X and $N_{yi}$ corresponds to the number of pixels along the axis Y. Each pixel $12_i$ is an elementary detector of radiation. In the example described, each pixel is an anode that, when biased, allows electrons produced during an interaction occurring in the detector material to be collected.

The area of each pixel $12_i$ may be relatively large, of the order of a few mm². When an ionising photon interacts in the detector material 11, charge carriers, for example electrons, migrate to one or more pixels, the latter being affected pixels: each affected pixel is a pixel that collects charge carriers. One interaction may give rise to one or more affected pixels. As described in the prior art, during their migration to an affected pixel, the charge carriers generate a signal, usually designated an induced signal, in the pixels adjacent to the one or more affected pixels.

Generally, each interaction gives rise to the formation of a detection signal by at least one pixel, most often by a plurality of pixels. The detection signal may be a signal resulting from the collection of charge carriers by the pixel $12_i$ or a signal induced by the migration of charge carriers through the detector material 11. In order to improve the spatial resolution of the gamma image, the gamma camera comprises a unit 14 for achieving sub-pixel resolution, said unit being programmed to attribute, to each detected interaction, a position (x, y) parallel to the detecting area 12, on the basis of detection signals formed by a plurality of pixels $12_i$ following each interaction. In the rest of the description, the position of an interaction corresponds to a position of the interaction parallel to the detecting area defined by the pixels $12_i$.

The gamma camera may comprise a collimator 10 in order to delineate the field of observation $\Omega$ liable to contain radiation sources 5. The pixels are exposed to radiation, originating from the radiation sources in the field of observation, during an acquisition period. In the course of the acquisition period, the pixels acquire detection signals resulting from interactions of ionising photons emitted by the radiation sources located in the field of observation. The collimator 10 may be a pinhole collimator or a coded-aperture mask. In the following example, the collimator 10 is a coded-aperture mask.

The gamma camera may be a Compton gamma camera, in which case the presence of a collimator is not necessary. A Compton gamma camera comprises a specific electronic circuit, allowing the respective positions, in the detector material, of two temporally coincident interactions to be estimated, and a direction of propagation of the incident radiation to be estimated.

The unit 14 for achieving sub-pixel resolution divides each pixel $12_i$ into virtual pixels (or sub-pixels) $13_{ij}$. The term "virtual pixel" designates the fact that a virtual pixel $13_{ij}$ is not physically tangible: it results from a virtual segmentation of each physical pixel $12_i$. The index j is an integer corresponding to a rank of each virtual pixel $13_{ij}$ in a pixel $12_i$, with $1 \leq j \leq J$. J corresponds to the number of virtual pixels in each pixel. The rank j of a virtual pixel $13_{ij}$ defines the position of the virtual pixel in a pixel $12_i$. Virtual pixels $13_{ij}$ of same rank are placed in the same position relatively to the pixel $12_i$. In the example shown in FIG. 1B, the rank j=1 corresponds to the top left-hand corner and the rank j=J corresponds to the bottom right-hand corner. In this figure, J=9: each pixel is segmented into 9 virtual pixels. The division into sub-pixels allows a gamma image J comprising a number of virtual pixels $13_{ij}$ equal to I×J to be formed. The virtual pixels $13_{ij}$ are aligned in rows (parallel to an axis X) and columns (parallel to an axis Y). The position of each virtual pixel $13_{ij}$ in the detecting area 12 is indicated by coordinates (x, y). The relationship between each virtual pixel $13_{ij}$ and each position (x, y) is bijective, and hence each position of coordinates (x, y) corresponds to a single virtual pixel $13_{ij}$, and vice versa.

The gamma camera 1 may comprise a unit programmed to determine the depth of interaction in the detector material, on the basis of detection signals formed by a plurality of pixels.

Under the effect of collection of charge carriers, each pixel $12_i$ generates a pulse, the amplitude of which depends on the energy released, in the detector material, by an ionising photon, in the course of an interaction, this energy usually being designated the "interaction energy". Optionally and advantageously, the gamma camera 1 comprises a spectrometry unit 15. The spectrometry unit 15 allows the amplitude of the pulses resulting from the collection of charge carriers following an interaction to be estimated as precisely as possible. The spectrometry unit 15 may employ electronic means (pulse-forming circuit, multichannel analyser, analogue-digital converter) or software means. Estimation of the amplitude of a pulse allows interaction energy to be estimated. This energy must be estimated as precisely as possible. The addressed energy range is generally comprised between 10 keV and a few hundred keV, or even a few MeV. It is desirable for the precision of the energy to be of the order of 1% or less.

Thus, the spectrometry unit 15 allows a spectrum of the radiation detected by each pixel to be obtained. The spectrometry unit 15 allows energy bands of interest, corresponding to unscattered photons, i.e. photons that have not been deviated since their emission by the radiation source, to be selected. Their selection, in predetermined energy bands, allows noise corresponding to scattered photons to be removed. Since the latter photons have been deviated since their emission, they provide no useful information as to the location of the radiation sources. Scattering is therefore a source of noise that may be significantly limited by spectrometry. Each energy band E lies between E±δE. 2δE thus corresponds to the spectral width of each energy band. For example, 2δE=0,2 keV.

Another advantage of spectrometric gamma cameras is that knowledge of the energy of the detected photons allows the isotopes responsible for the irradiation to be identified. This is information that is important in the field of radioprotection, or in the management of radioactive waste, or even when dismantling nuclear installations, or performing radiological characterization after an accident.

The gamma camera 1 comprises a memory 16 configured to store a quantity of interactions G(x, y) respectively assigned to each virtual pixel $13_{ij}$ of position (x, y). The gamma camera may comprise a processing unit 17 configured to form a gamma image G on the basis of the interactions positioned, by the unit 14 for achieving sub-pixel resolution, in each virtual pixel $13_{ij}$. The gamma image G is defined depending on the coordinates (x, y), parallel to the detecting area 12, each coordinate (x, y) corresponding to one virtual pixel $13_{ij}$. Each point G(x, y) of the gamma image G corresponds to one quantity of interactions assigned, by the unit 14 for achieving sub-pixel resolution, to one virtual pixel $13_{ij}$ of coordinates (x, y) in the detecting area 12. Conventionally, the processing unit may comprise a microprocessor programmed to execute instructions to implement certain steps described below, with reference to FIG. 3A.

When the spectrometry circuit 15 is employed, the memory 16 may store a quantity of interactions $G_E(x, y)$ in a plurality of energy bands E respectively assigned to each virtual pixel of coordinates (x, y). The processing unit 17 may generate, on the basis of a given field of observation, gamma images $G_E$ respectively representative of one energy band E. If the emission spectrum of an isotope is known, it is also possible to combine various energy bands, so as to form a gamma image $G_k(x, y)$ corresponding to a given isotope. The index k designates an isotope. The various energy bands are combined depending on energy-emission probabilities of the isotope, said probabilities being known. The decay schemes of isotopes liable to be constituents of the radiation sources in the field of observation are then taken into account. By decay scheme of an isotope, what is meant is the emission energy, or energies, and branching ratios (probabilities of emission of a photon at various emission energies).

The gamma camera 1 comprises a processing unit 18, which is configured to form an object image O on the basis of the gamma image G delivered by the unit 14 for achieving sub-pixel resolution, or, more generally, on the basis of a quantity of interactions detected by each virtual pixel, optionally per energy band. The object image may be formed using a reconstruction algorithm, as described below.

Figure 2A:
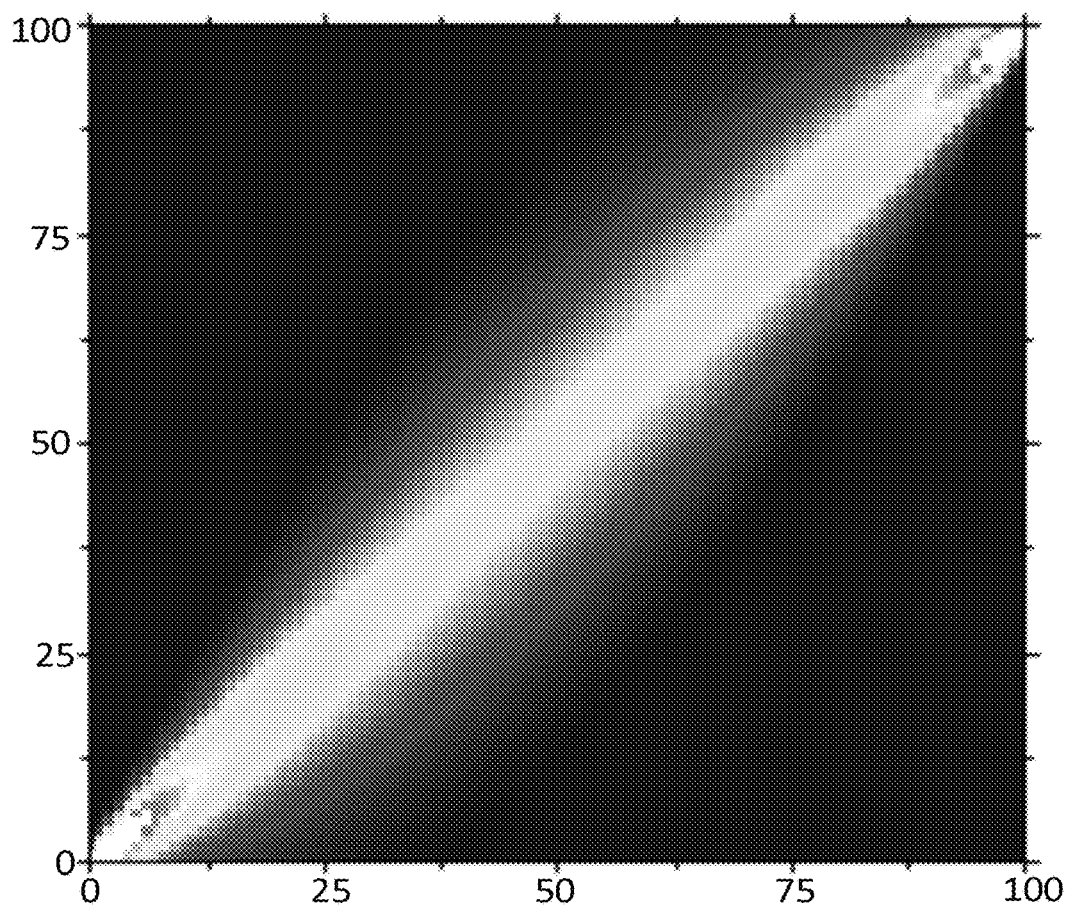
FIG. 2A shows a probability distribution of a position estimated by the unit for achieving sub-pixel resolution of the gamma camera, as a function of the actual position of an interaction, the position being defined parallel to the detecting area.

The inventors have observed that the segmentation into virtual pixels $13_{ij}$ is a source of non-uniformity in the sensitivity of the gamma camera. FIG. 2A shows, for a pixel $12_j$, a spatial response function of the unit for achieving sub-pixel resolution. This figure was obtained by simulation, for a unit for achieving sub-pixel resolution such as described in U.S. Pat. No. 9,322,937B2, and for a pixel of 2.5 mm side length. The y-axis corresponds to the actual position of an interaction, along a longitudinal axis X, inside a pixel. The x-axis corresponds to a "virtual" position attributed by the unit 14 for achieving sub-pixel resolution. In this example, the pixel was subdivided virtually into 100 increments along the axis X. Each increment corresponds to a spatial step of 25 μm size. The greyscale level corresponds to the value of a probability of attribution of the position indicated on the x-axis when the actual position corresponds to the position indicated on the y-axis. Each row of the matrix corresponds to a distribution of probabilities of assignment to an interaction of a position by the unit for achieving sub-pixel resolution, given the actual position of the interaction. Each column of the matrix corresponds to a distribution of probabilities of the actual position of an interaction, given an interaction position delivered by the unit for achieving sub-pixel resolution.

It may be seen that the assignment probability distribution is broader at the centre of the pixel (coordinate 50 in FIG. 2A) than at the edges of the pixel (coordinates 0 and 100 in FIG. 2A). FIG. 2A was simulated taking into account a photon energy of 122 keV. FIG. 2A depends on the energy of the photons. The higher the energy, the narrower the distribution of the probability of assignment of a position.

Figure 2B:
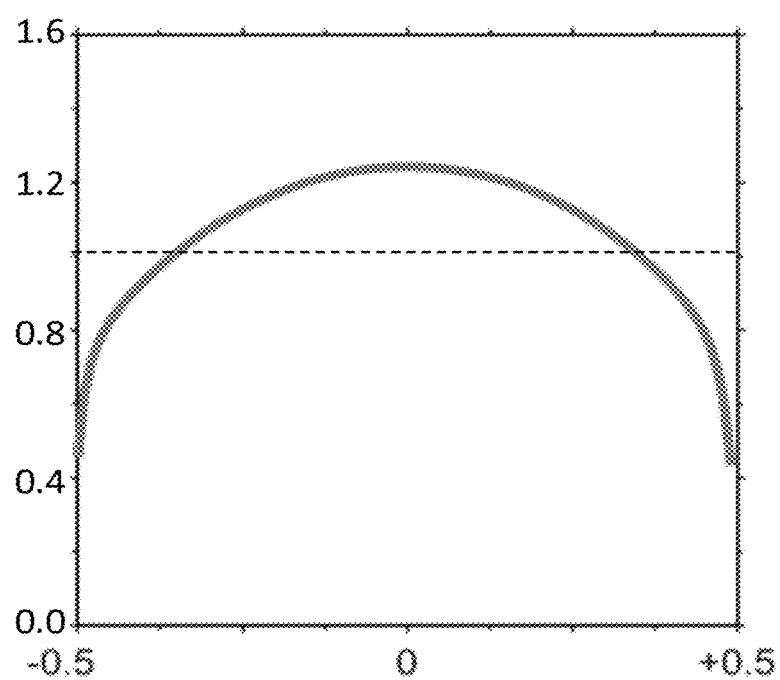
FIG. 2B illustrates a non-uniformity in the spatial-sensitivity function of the gamma camera.

In FIG. 2B, the solid curve corresponds to a projection of FIG. 2A onto the x-axis. This corresponds to a distribution of the probability of assignment of each "virtual" position along the axis X during irradiation of a pixel with spatially uniform radiation. In FIG. 2B, the x-axis corresponds to a position inside the pixel, the x-coordinate 0 corresponding to the centre of the pixel and the x-coordinates 0.5 and −0.5 corresponding to the left- and right-hand edges of the pixel. The y-axis corresponds to the probability that a virtual pixel, corresponding to the x-coordinate, will be considered, by the unit 14 for achieving sub-pixel resolution, to correspond to the position of an interaction, even though the spatial distribution of the radiation is uniform. It may be seen that the unit 14 for achieving sub-pixel resolution tends to over-estimate the number of interactions considered to be positioned at the centre of the pixel, to the detriment of the number of interactions considered to be positioned at the edge of each pixel. In other words, central virtual pixels (i.e.

virtual pixels located at the centre of a pixel) have a higher sensitivity then peripheral virtual pixels (i.e. virtual pixels located on the periphery of a pixel). The straight dashed line shows the probability distribution of the position assigned to each interaction in the case of a unit for achieving sub-pixel resolution that has a uniform spatial sensitivity.

Figure 2C:
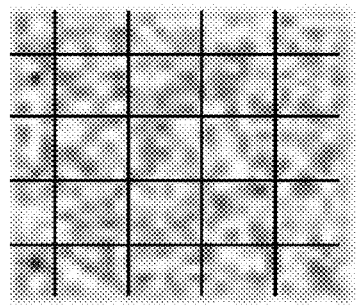
FIGS. 2C and 2D show a number of interactions assigned to various virtual pixels, the latter being defined to lie inside pixels belonging to rows or columns (demarcated by solid lines).
Figure 2D:
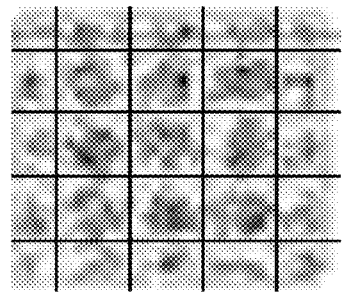

FIGS. 2C and 2D show one portion of a gamma image of sub-pixel resolution, i.e. delivered by the unit 14 for achieving sub-pixel resolution, a grid of black lines indicating the outlines of various pixels. In these figures, each virtual pixel corresponds to one point. FIGS. 2C and 2D result from simulations in which uniform radiation was considered. FIG. 2C corresponds to the actual position of the interactions. FIG. 2D shows the positions of the interactions that were obtained when the unit 14 for achieving sub-pixel resolution was employed. In these figures, the darker the greyscale level, the higher the quantity of interactions detected. It may be seen that the unit for achieving sub-pixel resolution induces striping in the gamma image: the virtual pixels located at the centre of each pixel are over-weighted, to the detriment of the virtual pixels located on the edge of the pixels. This is the consequence of the spatial distribution shown in FIG. 2B.

Figure 2E:
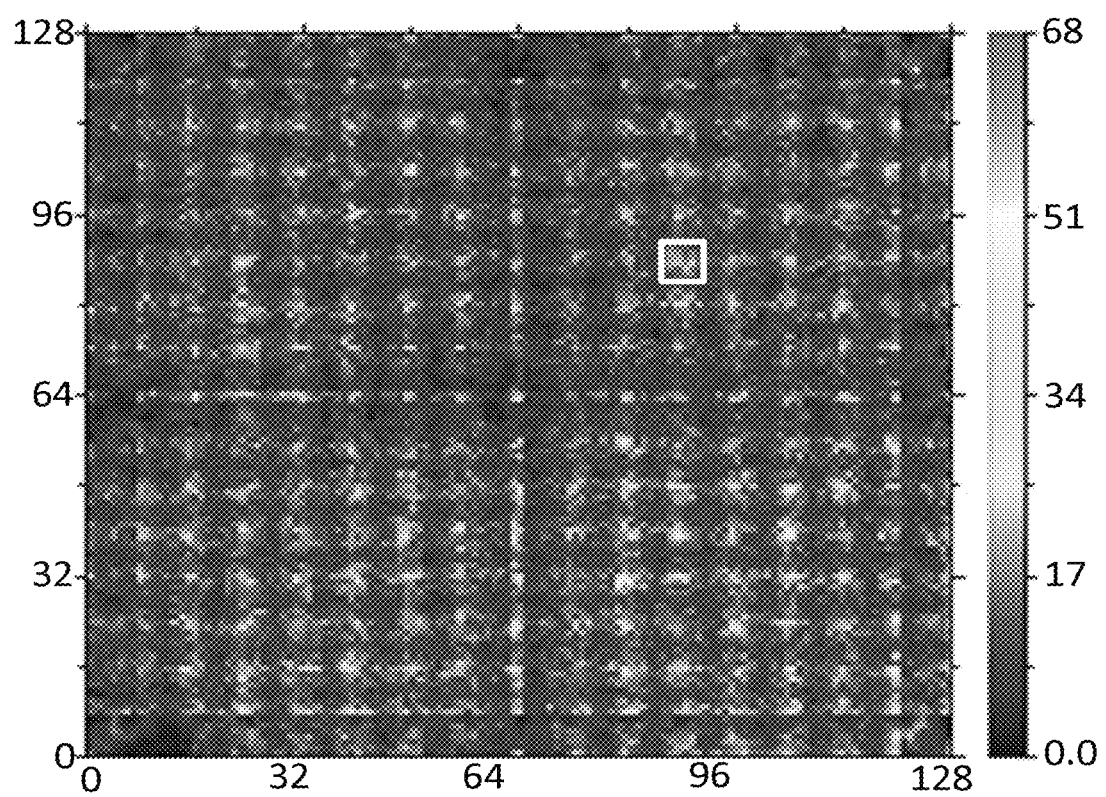
FIG. 2E shows one example of a gamma image acquired by a gamma camera such as schematically shown in FIG. 1A, the spatial-sensitivity function being non-uniform. The greyscale level of each virtual pixel corresponds to a number of interactions detected during one acquisition period.

FIG. 2E is a gamma image G of uniform radiation, essentially emitted by $^{60}Co$ (1173 keV and 1332 keV). It is an image acquired on-site, containing a contribution due to scattered radiation. In this example, the detecting area 12 contains rows of 16 pixels and columns of 16 pixels, i.e. a total of 256 pixels. Each pixel occupies an area of 2.5 mm×2.5 mm. Each pixel is divided into J=64 virtual pixels (8×8 virtual pixels). Thus, the gamma image formed has a side length of 128 pixels. In FIG. 2E, the lighter the greyscale level, the higher the quantity of interactions detected. The striping mentioned with reference to FIG. 2D is evident: the edges of each pixel may be seen as fewer interactions are detected on the edges of each pixel than at the centre of each pixel. Thus, spatially uniform radiation leads to the formation of a spatially non-uniform gamma image. When the gamma image is subjected to a reconstruction method, such as described below, such a non-uniformity may lead to the formation of artefacts in the reconstructed image: see FIGS. 7A and 7B, which are described below.

FIGS. 2A to 2E illustrate what happens when the unit 14 for achieving sub-pixel resolution has a non-uniform spatial-sensitivity function, the sensitivity of virtual pixels at the centre of each pixel being higher than the sensitivity of peripheral virtual pixels, the latter being adjacent to the edges of each pixel.

In order to correct the non-uniformity in the non-uniform spatial sensitivity of the unit 14 for achieving sub-pixel resolution, a first solution consists in exposing the gamma camera to uniform radiation, so as to form a calibration image, representing the response function. This is a solution that is technically simple but difficult to implement. Specifically, the spatial-sensitivity function depends on the energy of the incident radiation. However, the energy of the incident radiation may vary, depending on the isotopes from which the radiation sources are made. In addition, this energy is hard to predict, in particular when the radiation sources are composed of a plurality of isotopes in variable and unknown proportions, and/or when the radiation to which the gamma camera is exposed contains a high proportion of scattered radiation.

The inventor proposes a method for determining a spatial-sensitivity function. The spatial-sensitivity function allows the non-uniform spatial response of the unit 14 for achieving sub-pixel resolution to be corrected. This correction may be implemented in the field, without recourse to uniform calibration radiation. One particularly important aspect is that the spatial-sensitivity function may be deduced from the gamma image that is acquired by the gamma camera, and that is intended to be subjected to a reconstruction with a view to obtaining the position of the radiation sources in the field of observation. The method does not assume a calibration image has been acquired beforehand under laboratory conditions. The calibration image may be obtained from the gamma image acquired by the camera, in the field.

FIG. 3A schematically shows the main steps of the method, which steps are described below. FIG. 3B shows the various quantities used and schematically shows the, spatial or spectral, response functions associated with the collimator 10, with the unit 14 for achieving sub-pixel resolution, and with the spectrometry circuit 15, respectively.

Step 100: detecting interactions. The gamma camera 1 is placed in a field of observation $\Omega$ potentially containing radiation sources 5. In the course of an acquisition period, on the basis of detection signals generated by pixels $12_i$, the unit 14 for achieving sub-pixel resolution assigns each detected interaction to one virtual pixel $13_{ij}$, of coordinates (x, y). Thus, a quantity G(x, y) of interactions assigned to each virtual pixel is obtained.

Step 110: forming a gamma image G.

The quantities G(x, y) assigned to each pixel may be collated and ordered into the form of a gamma image G. Each gamma image G is defined in rows and columns.

FIG. 4A is one example of a gamma image G of 128×128 pixels.

The value G(x, y) of the gamma image, for each virtual pixel of position (x, y), corresponds to the number of interactions detected and positioned in the virtual pixel.

Step 120: Determining a weight H(x, y) for each virtual pixel.

On the basis of the quantity G(x, y) of interactions detected by each virtual pixel $13_{ij}$ of coordinates (x, y), step 120 determines a weight H(x, y) for each virtual pixel. The weight H(x, y) is representative of a sensitivity of the gamma camera for each virtual pixel. In the described example, the higher the weight, the higher the sensitivity of the virtual pixel: this corresponds to the fact that the probability of assignment of an interaction to the virtual pixel is high. The weight H(x, y) is an estimation of a probability that an interaction, and therefore the coordinates of the interaction, in the detecting area 12, is assigned to said virtual pixel $13_{ij}$ of coordinates (x, y). When the spatial-sensitivity function of the unit 14 for achieving sub-pixel resolution is uniform, the probability is equal for all the virtual pixels $13_{ij}$.

On the basis of the gamma image G delivered by the image-forming unit, it is possible to form a calibration image H representative of the response of the unit for achieving sub-pixel resolution. The calibration image H is defined for each virtual pixel $13_{ij}$. Each point H(x, y) of the calibration image is a weight H(x, y) assigned to the virtual pixel of coordinates (x, y).

Generally, the weight H(x, y) of each virtual pixel is obtained by dividing the virtual pixels into various groups, and by adding the values of the quantity G(x, y) of interactions assigned to the virtual pixels of a given group. Various embodiments are envisaged, in which the groups of virtual pixels are:

virtual pixels placed in the same row or in the same column: see sub-steps 121 to 123.

virtual pixels of the same rank j: see sub-steps 125 to 126.

Two embodiments may be envisaged. A first embodiment is described with reference to sub-steps 121 to 123. A second embodiment is described with reference to sub-steps 125 to 126.

Sub-step 121: forming a first vector $H_X$, representative of the total quantity $G(x, y)$ of interactions detected in the virtual pixels of each column (same coordinate y).

On the basis of the quantities $G(x, y)$ of interactions detected by each virtual pixel, a first vector $H_X$ is established. The first vector $H_X$ is determined for various columns of virtual pixels, these corresponding to various columns of the gamma image G. Each term $H_X(y)$ of the first vector is designated a "first term". Each first term $H_X(y)$ is associated with one column of virtual pixels. Each first term corresponds to a number of interactions assigned to virtual pixels of the same column. Thus, each first term is for example such that:

$$H_X(y) = \sum_{x=1}^{x=N_x} G(x, y) \qquad (1)$$

where $N_x$ is the number of rows of virtual pixels in question, corresponding to the number of rows in the gamma image G.

The size of $H_X$ is $(N_y, 1)$, where $N_y$ is the number of columns of virtual pixels. The vector $H_X$ may be considered to be a projection of the gamma image G, along the axis Y, on to the axis X.

FIG. 4B is a graphical representation of a first vector $H_X$ established for the gamma image shown in FIG. 4A. The x-axis corresponds to a rank of each term of the first vector $H_X$, comprised between 1 and 128. The y-axis corresponds to the value of each first term of the first vector.

Sub-step 122: forming a second vector $H_Y$, representative of the total quantity $G(x, y)$ of interactions detected in the virtual pixels of each row (same coordinate x).

Similarly, on the basis of the quantities $G(x, y)$ of interactions detected by each virtual pixel, a second vector $H_Y$ is established. The second vector $H_Y$ is determined for various rows of virtual pixels, these corresponding to various rows of the gamma image G. Each term $H_Y(x)$ of the second vector is designated a "second term". Each second term $H_Y(x)$ is associated with one row of virtual pixels. Each second term corresponds to a number of interactions assigned to virtual pixels of the same row. Thus, each second term is for example such that:

$$H_Y(x) = \sum_{y=1}^{y=N_y} G(x, y) \qquad (2)$$

The size of $H_Y$ is $(1, N_x)$. The vector $H_Y$ may be considered to be a projection of the gamma image G, along the axis X, onto the axis Y.

FIG. 4C is a graphical representation of a second vector $H_Y$, established for the gamma image shown in FIG. 4A. The x-axis corresponds to a rank of each term of the vector $H_Y$, comprised between 1 and 128. The y-axis corresponds to the value of each term.

Sub-Step 123: Forming the Sensitivity Matrix

The dyadic product of $H_X$ and $H_Y$ is computed, so as to obtain a matrix $H_{XY}$, of $$(N_x, N_y) \text{ size: } H_{XY} = H_X \otimes H_Y \qquad (3).$$

$\otimes$ is the "dyadic product" operator.

Thus, the value $H_{XY}(x, y)$ of each term of the matrix $H_{XY}$ is $H_X(y)H_Y(x)$:

$$H_{XY}(x,y) = H_X(y) \times H_Y(x) \qquad (4)$$

The matrix $H_{XY}$ is preferably normalized by the mean $\overline{H_{XY}}(x, y)$ of all of the terms $H_{XY}(x, y)$. Thus, the sensitivity-matrix-H is such that $$H(x, y) = \frac{H_{XY}(x, y)}{\overline{H_{XY}}(x, y)} \qquad (5)$$

the sensitivity matrix H is of same size as the gamma image G. Each term $H(x, y)$ of the sensitivity matrix H corresponds to a weight, assigned to the virtual pixel of coordinates (x, y).

FIG. 4D shows a sensitivity matrix H established by combining the vectors $H_X$ and $H_Y$. It may be seen that the sensitivity matrix H exhibits the striping of the gamma images discussed above. The sensitivity matrix H comprises horizontal or vertical dark lines, which correspond to regions in which the weight $H(x, y)$ assigned to each virtual pixel is low.

According to another embodiment, described with reference to sub-steps 125 and 126, each group of virtual pixels contains virtual pixels of the same rank.

Sub-step 125: On the basis of the interaction quantities $G(x, y)$ detected by each vertical pixel, i.e. the quantities resulting from step 100, a mean of the value of the virtual pixels of the same rank is computed. FIG. 5A shows another example of a gamma image G, acquired under in-the-field conditions, with a large amount of scattered radiation. FIG. 5B shows a mean image H', each point of which corresponds to a mean of the virtual pixels of the same rank of the gamma image G. The mean image H' comprises J points, J corresponding to the number of virtual pixels per pixel.

Each term $H'(x_j, y_j)$ of the mean image H' is such that $$H'(x_j, y_j) = \text{mean}(G(x,y)_j) \qquad (6)$$

where $G(x, y)_j$ corresponds to the quantity of interactions detected by each virtual pixel of rank j. mean designates the mean operator.

According to one possibility, the mean image H' is normalized, such that:

$$H'(x_j, y_j) = \frac{\text{mean}(G(x, y)_j)}{\text{mean}(G(x, y))}, \qquad (6)$$

FIG. 5B shows a mean image H' obtained from the gamma image shown in FIG. 5A.

Sub-step 126: on the basis of the mean image H', the calibration image H is formed by concatenating the mean image: the mean image H' is duplicated $N_{Xi}$ times along the axis X and $N_{Yi}$ times along the axis Y, $N_{Xi}$ and $N_{Yi}$ designating the number of pixels 12$_i$ per row and column of the detecting area 12, respectively. Thus, a calibration image H of the same size as the gamma image G is obtained. FIG. 5C shows one example of a calibration image obtained by concatenating a mean image H'.

The embodiment described with reference to sub-steps 125 and 126 assumes a certain spatial uniformity in the radiation detected by the gamma camera. This embodiment is particularly suitable for correcting the non-uniformities due to the unit for achieving sub-pixel resolution.

Step 120 allows a weight $H(x, y)$ to be defined for each virtual pixel, which weight is then used to process the quantities G(x, y) or $G_E(x, y)$ of interactions assigned to each virtual pixel during exposure, which quantities are stored in the memory 16. This processing aims to form an object image O of the field of observation Ω. By object image, what is meant is a spatial distribution of radiation sources in the field of observation Ω. According to one possibility, an object image $O_k$ representative of a spatial distribution of radiation sources comprising an isotope k is formed.

When a pinhole collimator 10 is used, the processing performed by the processing unit 18 is relatively simple. Specifically, the gamma camera delivers an immediate representation of the object image. The processing may be a simple normalization of the gamma image G by the calibration image H.

In this example, the gamma camera 1 comprises a coded-aperture mask collimator 10. This type of collimator is known to those skilled in the art. With this type of collimator, the image acquired by the imager is not a direct representation of the radiation sources in the field of observation. The gamma image G undergoes processing, taking into account a response function of the camera, so as to allow an image of the field of observation to be obtained that is representative of the position of the sources in the field of observation Ω. Passage from the gamma image, representative of a quantity of interactions detected by each virtual pixel, after application of the spatial-sensitivity function, to the image O of the field of observation Ω is described below. The image O is discretized into various coordinates (u, v).

Step 130: reconstructing

The overall image-forming model is such that $$G_E(x,y)=H(x,y)\Sigma_k S(E,k)[M(u,v)*O_k(u,v)](x,y) \quad (10)$$

where:

$G_E$ is a gamma image formed in an energy band E, the image being defined at various points (x, y), each point corresponding to one virtual pixel. This is a measured quantity, obtained from the interactions detected in step 100, the energy-band selection being carried out by the spectrometry unit 15.

H(x, y) is the weight assigned to each virtual pixel of coordinates (x, y), i.e. the weight resulting from step 120.

S(k, E) is a probability of detecting a photon in the energy band E for an isotope k of unit activity (1 Bq for example). S is a spectral response matrix of ($N_k$, $N_E$) size, where $N_k$ is the number of isotopes in question and $N_E$ is the number of energy bands addressed. This is an input datum. S accounts for a spectral response function of the gamma camera. FIG. 6 shows two rows of a spectral response matrix S, corresponding to $^{241}$Am and $^{57}$Co, respectively. In FIG. 6, the x-axis corresponds to a channel number, comprised between 1 and 1024.

The emission peaks of $^{241}$Am and $^{57}$Co, corresponding to energies of 59 keV ($^{241}$Am), and 122 keV and 136 keV ($^{57}$Co), respectively, may be seen.

M is a spatial response function of the gamma camera for a photon emitted from a position (u, v) in the field of observation Ω and reaching the virtual pixel (x, y). This is an input datum, which depends on the imaging mode used.

$O_k$(u, v) is an activity of isotope k at the position (u, v) in the field of observation. This is what it is desired to estimate. $O_k$ is an object image of ($N_u$, $N_v$) size, where $N_u$ and $N_v$ are the numbers of coordinates u and v into which the field of observation is discretized.

The general form of the spatial response function of the gamma camera is M(x, y, u, v). When the gamma camera 1 comprises a collimator 10, for example a coded-aperture mask collimator, the coordinates u, v are spatial coordinates. When the gamma camera is a Compton camera, i.e. a camera with no collimator, the coordinates u, v are angular coordinates, corresponding to the angles of incidence of the detected radiation.

Expression (10) assumes that the field of observation may be considered to be a surface $S_\Omega$, called the object surface, discretized into coordinates (u, v).

FIG. 3B schematically shows the main components of the gamma camera, and the response functions that are respectively associated therewith:

The collimator 10 defines the spatial response function M, which specifies a probability that an interaction detected by a virtual pixel of position (x, y) originates from a coordinate (u, v) of the object surface $S_\Omega$.

The spectrometry circuit 15, the detector material 11 and the pixels of the detecting area 12 define the spectral response function S.

The unit 14 for achieving sub-pixel resolution defines the sensitivity matrix H, which comprises all of the weights H(x, y) assigned to the various virtual pixels.

Passage from the detecting area 12 to the object surface $S_\Omega$ is a back-projection R, of the gamma image G, onto the object surface. Passage from the object surface $S_\Omega$ to the detecting area 12 is a projection P of the object image O onto the detecting area 12.

Expression (10) corresponds to a projection P. Expression (10) may be written in the following way:

$$\hat{G}_E(x,y)=H(x,y)\Sigma_k S(k,E)[\Sigma_{u,v}M(x-u,y-v)O_k(u,v)] \quad (12)$$

The objective of the reconstructing step is to estimate $\hat{O}_k$(u, V) on the basis of one or more gamma images $G_E$, respectively determined in one or more energy bands E. The estimation of $\hat{O}_k$(u, v) assumes the spatial response M, the spectral response S and the sensitivity matrix H, which results from step 120, and which represents the spatial-sensitivity function, are known.

According to a probabilistic approach, $$\hat{O}_k(u, v) = \sum_{E,x,y} p(k, u, v|E, x, y) G_E(x, y) \quad (13)$$

p(k, u, v|E, x, y) Is a probability of presence of an isotope k at position (u, v) given a measurement of an interaction in an energy band E by the virtual pixel (x, y). This probability may be estimated by applying Bayes' theorem.

$$p(k, u, v|E, x, y) = \frac{p(E, x, y|k, u, v)p(k, u, v)}{p(E, x, y)} \quad (14)$$

Expression (13) then becomes $$\hat{O}_k(u, v) = \sum_{E,x,y} \frac{p(E, x, y|k, u, v)p(k, u, v)}{p(E, x, y)} G_E(x, y) \quad (15)$$

The probabilities p(E, x, y|k, u, v) and p(E, x, y) are established using the direct model (projection), corresponding to (12).

Expression (15) then becomes:

$$\hat{O}_k(u, v) = \sum_{E,x,y} \frac{S(k, E)M(u-x, v-y)O_k(u, v)}{\sum_{k,u,v} H(x, y) \sum_k S(k, E)\left[\sum_{u,v} M(u-x, v-y)O_k(u, v)\right]} G_E(x, y) \quad (16)$$

$$\hat{O}_k(u, v) = O_k(u, v) \sum_{E,x,y} \frac{S(k, E)M(u-x, v-y)O_k(u, v)}{\sum_{k,u,v} H(x, y) \sum_k S(k, E)\left[\sum_{u,v} M(u-x, v-y)O_k(u, v)\right]} G_E(x, y) \quad (17)$$

$\hat{O}_k(u, v)$ may be estimated iteratively. Each iteration, of rank n, aims to estimate $\hat{O}_k^{(n+1)}(u, v)$ on the basis of a preceding estimate $\hat{O}_k^{(n)}(u, v)$. When n=0, the estimation is carried out on the basis of an initial estimate $\hat{O}_k^{(n=0)}(u, v)$. The initial estimate may for example be a uniform distribution of isotope k over the object surface.

From a first estimate $\hat{O}_k^{(n)}(u, v)$, each estimate $\hat{O}_k^{(n+1)}(u, v)$ is such that:

$$\hat{O}_k^{(n+1)}(u, v) = \sum_{E,x,y} \frac{S(k, E)M(u-x, v-y)\hat{O}_k^{(n)}(u, v)}{\sum_{k,u,v} H(x, y) \sum_k S(k, E)\left[\sum_{u,v} M(u-x, v-y)\hat{O}_k^{(n)}(u, v)\right]} G_E(x, y) \quad (18)$$

$$\hat{O}_k^{(n+1)}(u, v) = \hat{O}_k^{(n)}(u, v) \sum_{x,y} M(u-x, v-y) \quad (19)$$

$$\sum_E \frac{S(k, E)}{H(x, y)\sum_k S(k, E)\left[\sum_{u,v} M(u-x, v-y)\hat{O}_k^n(u, v)\right]} G_E(x, y)$$

The iterations continue until a criterion of stoppage of the iterations is met. The criterion of stoppage of the iterations may be a predetermined number of iterations or an error criterion considered to be sufficiently low. The error criterion may be an error between the acquired image $G_E$ and the projection $\hat{G}_E$ of $\hat{O}_k^{(n)}(u, v)$ onto the detecting area, the projection $\hat{G}_E$ being obtained via expression (12). It may be a quadratic error or a Kullback-Leibler divergence between the acquired image $G_E$ and the projection $\hat{G}_E$.

In order to minimize the size of the mathematical quantities used, the gamma image $G_E(x, y)$ may be formed in a list mode, in which the image is formed by a sum of detected interactions. To each interaction is a assigned a rank l, which may be established chronologically.

Each interaction of rank 1 is likened to a delta function at the coordinate $(x_l, y_l)$.

Thus, $$G_E(x,y) = \Sigma_l \delta(x_l, y_l, E_l = E) \quad (20)$$

$x_l$ and $y_l$ designating the coordinates of the interaction of rank l, and $E_l$ being the energy detected for the interaction of rank l. Expression (19) becomes:

$$\hat{O}_k^{(n+1)}(u, v) = \hat{O}_k^{(n)}(u, v) \sum_{x,y} M(u-x, v-y) \quad (21)$$

$$\sum_l \frac{S(k, E_l)}{H(x_l, y_l)\sum_k S(k, E_l)\left[\sum_{u,v} M(u-x_l, v-y_l)\hat{O}_k^{(n)}(u, v)\right]}$$

-continued $$\hat{O}_k^{(n+1)}(u, v) = \hat{O}_k^{(n)}(u, v) \sum_{x,y} M(u-x, v-y) \sum_l p_{kl}^{(n)} \delta_{x_l,y_l}(x, y, E_l) \quad (22)$$

where $p_{kl}^{(n)}$ is a weighting factor assigned to interaction l in the formation of the spatial distribution $\hat{O}_k^{(n+1)}$ of isotope k in the field of observation.

$$p_{kl}^{(n)} = \frac{S(k, E_l)}{H(x_l, y_l)\sum_k S(k, E_l)\left[\sum_{u,v} M(u-x_l, v-y_l)\hat{O}_k^{(n)}(u, v)\right]} \quad (23)$$

Let $w_{kl}^{(n)} = S(k,E_l)[\Sigma_{u,v}M(u-x_l,v-y_l)\hat{O}_k^{(n)}(u,v)]$ (24)

$w_{kl}^{(n)}$ be a probability of detecting an interaction of rank l and of energy $E_l$, corresponding to an isotope k, taking into account the spatial distribution $\hat{O}_k^{(n)}$.

The sum $\Sigma_{u,v}M(u-x_l, v-y_l)\hat{O}_k^{(n)}(u, v)$ is equivalent to a convolution product $M*\hat{O}_k^{(n)}$ corresponding to the direct model of formation of the gamma image on the basis of knowledge of the spatial distribution of isotope k in the field of observation. It is an estimation of the gamma image G, at the point of coordinates $(x_l, y_l)$, taking into account the spatial distribution $\hat{O}_k^{(n)}$ of isotope k in the field of observation.

$S(k, E_l)$ corresponds to an energy component of the probability $w_{kl}^{(n)}$, whereas $\Sigma_{u,v}M(u-x_l, v-y_l)\hat{O}_k^{(n)}(u, v)$ corresponds to a spatial component of the probability $w_{kl}^{(n)}$.

The sum $\Sigma_k w_{kl}^{(n)} = \Sigma_k S(k, E_l)[\Sigma_{u,v}M(u-x_l, v-y_l)\hat{O}_k^{(n)}(u, v)]$ corresponds to the sum of the probabilities $w_{kl}^{(n)}$ over all of the isotopes k.

On account of (23) and (24), $$p_{kl}^{(n)} = \frac{S(k, E_l)}{H(x_l, y_l)\sum_k w_{kl}} \quad (25)$$

In expression (22), $\Sigma_l p_{kl}^{(n)} \delta(x_l, y_l, E_l)$ may be likened to a relative error $\varepsilon_{jk}^{(n)}(x, y)$, for isotope k, the back-protection of which yields an updated image $U_k^{(n)}$ for isotope k.

Expression (22) may be written:

$$\hat{O}_k^{(n+1)}(u,v) = \hat{O}_k^{(n)}(u,v)U_k^{(n)}(u,v) \quad (26)$$

with $U_k^{(n)}(u,v) = \Sigma_{x,y}M(u-x,v-y)\varepsilon_k^{(n)}(u,v)$ (27).

Equation (27) corresponds to a back-projection of the relative error term $\varepsilon_k^{(n)}$ into the field of observation $\Omega$, via convolution with the response function M of the collimator.

Equation (26) is an equation describing the update of the spatial distribution $\hat{O}_k^{(n)}(u, v)$ of isotope k in the field of observation, in each iteration n.

The reconstruction process described above shows how the sensitivity matrix H is taken into account to compensate for the non-uniformity in the sensitivity of the gamma camera, following the process used to achieve sub-pixel resolution. The weight H(x, y) thus allows the extent to which interactions positioned at the coordinates (x, y) are taken into account to be weighted. Thus, depending on the value H(x, y), the lower the value H(x, y), the higher the weight $p_{kl}^n$ assigned to an interaction positioned at (x, y). This makes it possible to increase the weight of interactions detected at coordinates at which the value of H(x, y) is low.

In the steps that have just been described, steps 120 and 130 are carried out on the basis of the interactions detected in step 100. Thus, the object image O is reconstructed using detected interactions G(x, y) that were used to form the sensitivity matrix H.

According to one variant, the sensitivity matrix H is updated periodically. Between two updates, the gamma camera is exposed to various fields of observation. During each acquisition period, the object image is reconstructed using a sensitivity matrix H determined beforehand. In other words, the reconstructing step 130 may be implemented using weights H(x, y) established beforehand using a gamma image different from the one on which the reconstructing step is performed. It is however preferable to use a calibration function H determined with the gamma camera exposed to radiation comparable, from the energy point of view, to the radiation to which the gamma camera is exposed during the acquisition of the gamma image forming the subject of the reconstruction.

One notable advantage of the invention is that the weights H(x, y) may be updated, in the course of each acquisition of a gamma image, this allowing detection uniformity in light of the acquisition conditions to be taken into account. This notably allows effects induced by radiation sources located outside of the field of observation, but that may have an influence on the acquired image, to be taken into account. Thus, the sensitivity matrix, which results from step 120, may be used to compensate for a non-uniform sensitivity due to the unit for achieving sub-pixel resolution, but also to compensate for the influence of out-of-field radiation sources or for any other cause of non-uniformity in sensitivity, such as, for example, a defect in the detector material.

The inventors have implemented the method described with reference to steps 100 to 130. A gamma camera comprising a CdZnTe semiconductor detector of 6 mm thickness with a matrix array of 16×16 pixels of 2.5 mm side length was employed, each pixel being sub-divided into 8×8 virtual pixels: the detecting area was segmented into 128×128 virtual pixels. The field of observation mainly contained $^{60}$Co sources, though there was a substantial contribution from scattered radiation. The radiation level, at the camera, was 70 μSv/h.

FIGS. 7A, 7C and 7E are gamma images obtained, respectively:
without processing;
after normalization by weights H(x, y) determined, on the basis of the gamma image shown in FIG. 7A, by implementing the first embodiment (sub-steps 121 to 123);
after normalization by weights H(x, y) determined, on the basis of the gamma image shown in FIG. 7A, by implementing the second embodiment (sub-steps 125 to 126).

FIGS. 7B, 7D and 7F are object images obtained by performing a reconstruction such as described in step 130, respectively:
without taking into account weights H(x, y): step 130 is implemented considering H(x, y)=1;
taking into account weights such as determined according to the first embodiment (sub-steps 121 to 123);
taking into account weights such as determined according to the second embodiment (sub-steps 125 to 126).

Without implementation of the invention, the reconstructed image comprises artefacts, indicated by arrows in FIG. 7B. The actual radiation source is encircled by a dotted circle in FIG. 7B. FIGS. 7D and 7F show that implementing the invention allows the presence of artefacts to be limited.

The radiation source is located with a significantly improved signal-to-noise ratio. The invention allows the quantity of interactions detected by each virtual pixel to be weighted upstream of the reconstruction. It is particularly advantageous when the collimator is a coded-aperture mask, as the non-uniformity in the detection sensitivity of such a collimator may generate reconstruction artefacts, such as shown in FIG. 7B.

One notable advantage of the invention is that the weights assigned to each virtual pixel may be determined using detection signals acquired while the gamma camera is deployed in the field, and hence laboratory conditions under which the irradiation of each virtual pixel is uniform are not required. Since the spatial-sensitivity function is liable to vary as a function of the energy of the radiation to which the gamma camera is exposed, the ability to establish a spatial-sensitivity function dependent on the conditions actually encountered in the field is particularly advantageous. Specifically, these conditions are hard to predict and to reproduce in a laboratory, notably in the case of presence of a large contribution from scattered radiation.

The weights assigned to each virtual pixel may be updated regularly, using gamma images acquired in the field. Thus, a given spatial-sensitivity function H may be used to reconstruct an object image from a gamma image acquired before or after the spatial-sensitivity function is determined. In this case, it is preferable for the radiation to which the gamma camera is exposed, during the acquisition of the gamma image, to be comparable, from the energy point of view, to the detected radiation used to establish the spatial-sensitivity function employed for the reconstruction.

Although described with reference to a unit for achieving sub-pixel resolution, the embodiment described with reference to steps 121 to 123 may be implemented on a gamma camera, the pixels of which are small in size, for example smaller than 1 mm$^2$ in size. Sub-division into virtual pixels is not necessary. Thus, according to one variant, the sensitivity matrix H may be formed taking into account interactions assigned to each pixel, said pixels being grouped into rows of pixels and columns of pixels. Expressions (1) and (2) are applied to the pixels of the same column and to the pixels of the same row, respectively. A sensitivity matrix defined for each pixel is then obtained, one weight being determined for each pixel. The sensitivity matrix may allow allowance to be made for a non-uniform gamma-camera sensitivity due to the presence of out-of-field sources or of local defects in the detector material.

The invention claimed is:

1. A method for determining a spatial-sensitivity function of a gamma camera, the gamma camera being configured to locate radiation sources in a field of observation, the gamma camera comprising:
   a detector material;
   pixels, distributed over a detecting area of the detector material, each pixel being configured to form a detection signal under an effect of detection of an interaction of an ionizing photon in the detector material;
   circuitry configured to assign, to each detected interaction, a position parallel to the detecting area, based on the detection signals formed by a plurality of the pixels, the position being determined on a mesh of the detecting area that divides each pixel into virtual pixels, the virtual pixels being distributed in rows and columns; and
   a memory to store a quantity of interactions detected during an acquisition period and respectively assigned to each of the virtual pixels, the method comprising:
- (a) acquiring the detection signals with the pixels during one acquisition period, each detection signal being associated with one detected interaction;
- (b) depending on the acquired detection signals, attributing a position of each interaction detected, during the acquisition period, to one virtual pixel;
- (c) storing, in the memory, a number of detected interactions assigned to each of the virtual pixels;
- (d) defining groups of the virtual pixels, each group containing at least two of the virtual pixels;
- (e) computing a value for each group, the value for each group being computed based on a sum of the number of detected interactions positioned in each virtual pixel belonging to said group, and
- (f) based on the value computed for each group, assigning a weight to each of the virtual pixels, the weight assigned to each of the virtual pixels being representative of a detection sensitivity of said virtual pixel, all of the weights respectively assigned to each of the virtual pixels forming the spatial-sensitivity function of the gamma camera.

2. The method according to claim 1, wherein:
the virtual pixels are distributed in the rows and the columns over the detecting area;
each group of the virtual pixels contains virtual pixels belonging to a same row or to a same column;
step (e) further comprises
- (e-1) forming a first vector, containing first terms, each first term being associated with one column of the virtual pixels, each first term comprising a sum of a quantity of the detected interactions positioned in each virtual pixel of the column; and
- (e-2) forming a second vector, containing second terms, each second term being associated with one row of the virtual pixels, each second term comprising a sum of a quantity of the detected interactions positioned in each virtual pixel of the row; and step (f) further comprises:
- (f-1) for each of the virtual pixels, computing a product of a first term, associated with the one column of the virtual pixels, by a second term, associated with the one row of the virtual pixels; and
- (f-2) determining the weight assigned to each of the virtual pixels depending on the product computed in sub-step (f-1).

3. The method according to claim 2, wherein sub-step (f-2) further comprises:
computing a mean value of the products respectively computed, in sub-step (f-1), for a set of the virtual pixels; and
for each of the virtual pixels, normalizing the product resulting from sub-step (f-1) by the computed mean value.

4. The method according to claim 1, wherein:
each pixel is divided into a same number of the virtual pixels;
with each of the virtual pixels is associated with a rank, the rank defining a position of the virtual pixel in a pixel;
each group of the virtual pixels contains virtual pixels of a same rank;
step (e) further comprises computing a mean value of the number of the detected interactions positioned in the virtual pixels, of the same rank, of various pixels; and
in step (f), the weight assigned to a virtual pixel of a rank corresponds to the mean value computed in step (e) for said rank.

5. The method according to claim 1, further comprising:
- (g) generating a sensitivity matrix, each point of the sensitivity matrix corresponding to a particular virtual pixel of the gamma camera, a value of the generated sensitivity matrix at each point corresponding to the weight assigned to the particular virtual pixel.

6. The method according to claim 1, wherein the gamma camera further comprises processing circuitry configured to process the detected interactions stored in the memory, wherein the method further comprises (h) reconstructing a spatial distribution of the radiation sources, in the field of observation, based on the detected interactions stored in step (c) and the weights assigned to each of the virtual pixels in step (f).

7. The method according to claim 6, wherein the processing circuitry is further configured to normalize a number of the detected interactions detected by each of the virtual pixels by the weight assigned to said virtual pixel.

8. The method according to claim 6, wherein:
each pixel is connected to a spectrometry device configured to classify each detection signal into one energy band among a plurality of energy bands;
in step (b), each interaction positioned in a particular virtual pixel is associated with one detected energy band; and
step (h) further comprises
taking into account an isotope, the isotope emitting photons in at least one emission energy; and
reconstructing the spatial distribution of the radiation sources comprising the isotope based on the interactions positioned in step (b).

9. The method according to claim 8, wherein the step of reconstructing the spatial distribution further comprises reconstructing the spatial distribution based on:
a spectral response function of each pixel, the spectral response function representing a detection probability, in various energy bands, of each photon emitted by the isotope and detected in the pixel; or
a spatial response function representing a probability of detection, in various ones of the virtual pixels, of a photon emitted from one point in the field of observation.

10. The method according to claim 1, wherein the gamma camera further comprises a collimator defining the field of observation.

11. A method comprising:
- (i) acquiring the detection signals with the pixels of the gamma camera during the acquisition period, each detection signal being associated with one detected interaction;
- (ii) depending on the acquired detection signals, assigning the position of each interaction detected during the acquisition period, the position corresponding to one of the virtual pixels;
- (iii) storing, in the memory, the number of detected interactions assigned to each of the virtual pixels;
- (iv) assigning the weights respectively to each virtual pixel, each weight being determined by implementing the method according to claim 1 and being performed by exposing the gamma camera to a particular field of observation; and
- (v) reconstructing the spatial distribution of the radiation sources, in the particular field of observation, based on the detected interactions stored in step (iii) and the weights assigned to each of the virtual pixels in step (iv).

12. The method according to claim 11, wherein:
in step (i), the particular field of observation is identical to the field of observation of the gamma camera in step (a);
step (ii) and step (b) are identical; and
step (iii) and step (c) are identical.

13. The method according to claim 11, wherein:
in step (i), the particular field of observation is different from the field of observation of the gamma camera in step (a); and
step (iv) is implemented taking into account the weights assigned to each of the virtual pixels, the weights having been established during implementation of steps (a) to (f), prior to or subsequent to step (i).

14. A gamma camera configured to detect a presence of radiation sources in a field of observation, the gamma camera comprising:
a detector material;
pixels, distributed over a detecting area of the detector material, each pixel being configured to form a detection signal under an effect of detection of an interaction of an ionizing photon in the detector material;
circuitry configured to assign, to each detected interaction, a position parallel to the detecting area, based on the detection signals formed by a plurality of the pixels, the position being determined on a mesh of the detecting area that divides each pixel into virtual pixels, the mesh of the detecting area distributing the virtual pixels in rows and columns;
a memory to store a quantity of interactions detected during an acquisition period and respectively assigned to each of the virtual pixels; and
processing circuitry configured to
define a plurality of groups of the plurality of virtual pixels, each group containing at least two of the plurality of virtual pixels;
compute a value for each group of the plurality of groups, the value for each group being computed based on a sum of the number of detected interactions positioned in each virtual pixel belonging to the group, and
based on the value computed for each group, assign a weight to each virtual pixel of the plurality of virtual pixels, the weight assigned to each virtual pixel being representative of a detection sensitivity of the virtual pixel, all of the weights respectively assigned to each virtual pixel forming the spatial-sensitivity function of the gamma camera.

15. A method for determining a spatial-sensitivity function of a gamma camera, the gamma camera being configured to locate radiation sources in a field of observation, the gamma camera comprising:
a detector material;
pixels, distributed over a detecting area of the detector material, each pixel being configured to form a detection signal under an effect of detection of an interaction of an ionizing photon in the detector material; and
a memory to store a quantity of interactions detected during an acquisition period and respectively assigned to each of the pixels,
the method comprising:
(a) acquiring the detection signals with the pixels during one acquisition period, each detection signal being associated with one detected interaction;
(b) depending on the acquired detection signals, attributing a position of each interaction detected, during the acquisition period, to one pixel;
(c) storing, in the memory, a number of detected interactions assigned to each of the pixels;
(d) defining groups of the pixels, each group containing at least two of the pixels;
(e) computing a value for each group, the value for each group being computed based on a sum of the number of detected interactions positioned in each pixel belonging to said group, and
(f) based on the value computed for each group, assigning a weight to each of the pixels, the weight assigned to each of the pixels being representative of a detection sensitivity of said pixel, all of the weights respectively assigned to each of the pixels forming the spatial-sensitivity function of the gamma camera.

16. The method according to claim 15, wherein:
the pixels are distributed in the rows and the columns over the detecting area;
each group of the pixels contains pixels belonging to a same row or to a same column;
step (e) further comprises
(e-1) forming a first vector, containing first terms, each first term being associated with one column of the pixels, each first term comprising a sum of a quantity of the detected interactions positioned in each pixel of the column; and
(e-2) forming a second vector, containing second terms, each second term being associated with one row of the pixels, each second term comprising a sum of a quantity of the detected interactions positioned in each pixel of the row; and
step (f) further comprises:
(f-1) for each of the pixels, computing a product of a first term, associated with the one column of the pixels, by a second term, associated with the one row of the pixels; and
(f-2) determining the weight assigned to each of the pixels depending on the product computed in sub-step (f-1).

17. The method according to claim 16, wherein sub-step (f-2) further comprises:
computing a mean value of the products respectively computed, in sub-step (f-1), for a set of the pixels; and
for each of the pixels, normalizing the product resulting from sub-step (f-1) by the computed mean value.

18. The method according to claim 15, further comprising:
(g) generating a sensitivity matrix, each point of the sensitivity matrix corresponding to a particular pixel of the gamma camera, a value of the generated sensitivity matrix at each point corresponding to the weight assigned to the particular pixel.

19. A method, comprising:
(i) acquiring the detection signals with the pixels of the gamma camera during the acquisition period, each detection signal being associated with one detected interaction;
(ii) depending on the acquired detection signals, assigning the position of each interaction detected during the acquisition period, the position corresponding to one of the pixels;
(iii) storing, in the memory, the number of detected interactions assigned to each of the pixels;

(iv) assigning the weights respectively to each pixel, each weight being determined by implementing the method according to claim 15; and (v) reconstructing the spatial distribution of the radiation sources, in the particular field of observation, based on the detected interactions stored in step (iii) and the weights assigned to each of the pixels in step (iv).

20. A gamma camera configured to detect a presence of radiation sources in a field of observation, the gamma camera comprising:

a detector material;

pixels, distributed over a detecting area of the detector material, each pixel being configured to form a detection signal under the effect of detection of the interaction of an ionizing photon in the detector material;

a memory to store a quantity of interactions detected during an acquisition period and respectively assigned to each of the pixels; and processing circuitry configured to define groups of the pixels, each group containing at least two of the pixels;

compute a value for each group, the value for each group being computed based on a sum of the number of detected interactions positioned in each pixel belonging to the group, and based on the value computed for each group, assign a weight to each of the pixels, the weight assigned to each of the pixels being representative of a detection sensitivity of the virtual pixel, all of the weights respectively assigned to each of the pixels forming the spatial-sensitivity function of the gamma camera.

* * * * *